US012272180B2

(12) United States Patent
Li et al.

(10) Patent No.: US 12,272,180 B2
(45) Date of Patent: Apr. 8, 2025

(54) TARGET SERVICE EXECUTION METHOD AND ELECTRONIC DEVICE

(71) Applicant: HUAWEI TECHNOLOGIES CO., LTD., Guangdong (CN)

(72) Inventors: Zhuofei Li, Beijing (CN); Liang Wang, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 18/246,032

(22) PCT Filed: Sep. 15, 2021

(86) PCT No.: PCT/CN2021/118562
§ 371 (c)(1),
(2) Date: Mar. 20, 2023

(87) PCT Pub. No.: WO2022/068591
PCT Pub. Date: Apr. 7, 2022

(65) Prior Publication Data
US 2023/0360445 A1 Nov. 9, 2023

(30) Foreign Application Priority Data
Sep. 30, 2020 (CN) .......................... 202011063589.1

(51) Int. Cl.
G06F 17/00 (2019.01)
G06F 21/32 (2013.01)
(Continued)

(52) U.S. Cl.
CPC ........... *G07B 15/063* (2013.01); *G06F 21/32* (2013.01); *H04W 4/44* (2018.02); *H04W 76/14* (2018.02)

(58) Field of Classification Search
CPC ........... H04W 4/40; H04W 4/48; H04W 4/44; H04W 76/14; H04W 88/02; G07B 15/063; G06F 21/32; G06F 30/15
(Continued)

(56) References Cited

U.S. PATENT DOCUMENTS

2014/0170974 A1* 6/2014 Lin ....................... H04W 12/50
455/41.1
2015/0204679 A1* 7/2015 Aist .................... G01C 21/3682
701/400
(Continued)

FOREIGN PATENT DOCUMENTS

CN 106296842 * 1/2017 ........... G07B 15/063
CN 107330989 A 11/2017
(Continued)

OTHER PUBLICATIONS

Na (Year: 2000).*

*Primary Examiner* — Daniel St Cyr

(57) ABSTRACT

Embodiments of this application provide a target service execution method and an electronic device. The method includes: receiving a first broadcast signal from a first device, where the first broadcast signal carries an identifier of the first device; starting a target application in an electronic device based on the identifier of the first device; and when receiving a second broadcast signal from a second device, establishing a communication connection between the target application and the second device based on an identifier of the second device that is carried in the second broadcast signal, to execute a target service corresponding to the target application. The foregoing method can improve a success rate of establishing a connection between the electronic device and the second device.

20 Claims, 14 Drawing Sheets

(51) Int. Cl.
    *G07B 15/06*     (2011.01)
    *H04W 4/44*     (2018.01)
    *H04W 76/14*     (2018.01)

(58) Field of Classification Search
    USPC ................ 235/375, 383, 462.46, 472.02
    See application file for complete search history.

(56) References Cited

U.S. PATENT DOCUMENTS

| | | | |
|---|---|---|---|
| 2018/0101704 A1* | 4/2018 | Ng | G06Q 10/00 |
| 2018/0137538 A1* | 5/2018 | Hacker | H04N 1/0019 |
| 2018/0143628 A1* | 5/2018 | Samper | B60W 30/18027 |

FOREIGN PATENT DOCUMENTS

| | | | | |
|---|---|---|---|---|
| CN | 109801386 A | 5/2019 | | |
| CN | 109858916 A | 6/2019 | | |
| CN | 110072221 A | 7/2019 | | |
| EP | 2320403 | * 5/2011 | ............. | G08G 1/104 |

* cited by examiner

TARGET SERVICE EXECUTION METHOD AND ELECTRONIC DEVICE

CROSS-REFERENCE TO RELATED APPLICATIONS

This application is a national stage of International Application No. PCT/CN2021/118562, filed on Sep. 15, 2021, which claims priority to Chinese Patent Application No. 202011063589.1, filed on Sep. 30, 2020. Both of the aforementioned applications are hereby incorporated by reference in their entireties.

TECHNICAL FIELD

This application relates to the field of electronic technologies, and specifically, to a target service execution method and an electronic device.

BACKGROUND

During development of highway toll collection modes, manual toll collection modes with staff are mostly used in an early phase. This consumes a large amount of manpower and material resources. In addition, if one vehicle is charged at a time, toll collection duration increases. In recent years, to resolve problems caused by the manual toll collection modes, electronic toll collection (electronic toll collection, ETC) emerges. In the electronic toll collection, background settlement is performed with a bank by using a computer networking technology through microwave dedicated short-range communication between an on-board unit installed on a windshield of a vehicle and a microwave antenna on an ETC lane at a toll station, so that the vehicle can pay a toll without stopping at the highway toll station.

However, when an ETC technology is used, an on-board unit needs to be installed and updated for each vehicle. As a result, hardware costs are relatively high, and it is difficult to manage a user (for example, a highway toll needs to be paid even if the vehicle is lent). With application and popularization of mobile terminals, a related technology for converting an ETC payment mode into payment using a mobile terminal has been developed.

However, because a vehicle moves fast on a highway, using a conventional technology causes a problem that a mobile terminal cannot establish a connection in a timely manner and therefore cannot complete a payment transaction.

SUMMARY

Embodiments of this application provide a target service execution method and an electronic device, to improve a success rate of establishing a connection by an electronic terminal in a target service execution process.

According to a first aspect, an embodiment of this application provides a target service execution method. The method is performed by an electronic device and includes: receiving a first broadcast signal from a first device, where the first broadcast signal carries an identifier of the first device; starting a target application in the electronic device based on the identifier of the first device; and when receiving a second broadcast signal from a second device, establishing a communication connection between the target application and the second device based on an identifier of the second device that is carried in the second broadcast signal, to execute a target service corresponding to the target application, where the first device is one of at least one first device deployed on a moving path of the electronic device, the second device is one of at least one second device deployed on the moving path of the electronic device, and the first device is deployed closer to a start point of the moving path of the electronic device than the second device.

The electronic device may be a mobile terminal, a vehicle-mounted device, or a device of another type. The first device may be a Bluetooth device, and the identifier of the first device may be a universally unique identifier (universally unique identifier, UUID). The first device is configured to wake up and start the target application in the electronic device. The second device may also be a Bluetooth device, and is configured to establish the communication connection to the target application. The target application may be a road toll collection application, a clock-in/out application, or an application with another function.

In the foregoing target service execution method, the first device is deployed closer to the start point of the moving path of the electronic device than the second device, and the first device first starts the target application in the electronic device, to ensure that the target application is started before the connection to the second device is established, and then improve a success rate of establishing a connection between the electronic device and the second device, to improve a success rate of completing the target service.

With reference to the first aspect, in some implementations of the first aspect, a deployment distance between the first device and the second device is determined based on a signal coverage area of the first device, a signal coverage area of the second device, startup duration of the target application, and a moving speed of the electronic device.

With reference to the first aspect and the foregoing implementation, the deployment distance between the first device and the second device is determined in the foregoing manner, to further ensure that the target application in the electronic device is started before the electronic device enters the signal coverage area of the second device, so as to further improve a success rate of establishing a connection between the electronic device and the second device.

In a possible implementation, the starting a target application in the electronic device based on the identifier of the first device includes: comparing the identifier of the first device with a device identifier set prestored in the electronic device; and starting the target application in the electronic device if an identifier that matches the identifier of the first device exists in the device identifier set.

The prestored device identifier set includes an identifier of a deployed device that is delivered by a server to the electronic device after a user registers with the target application by using the electronic device. The electronic device may determine, by comparing the received identifier of the first device with the device identifier set, whether the first device is an actually deployed device, to avoid an unnecessary target application startup operation caused by some interference devices (or interference signals).

In a possible implementation, the electronic device includes a Bluetooth agent module, and the starting the target application in the electronic device includes: starting the target application in the electronic device by using the Bluetooth agent module.

Optionally, the electronic device may include a Bluetooth chip and the Bluetooth agent module. After the Bluetooth chip compares the identifier of the first device with the device identifier set, the target application may be run and started by using the Bluetooth agent module without a manual operation of a user. This implements an unconscious execution process for the user, and improves convenience of a target service execution procedure.

In a possible implementation, after the starting a target application in the electronic device, the method further includes: detecting the second broadcast signal from the second device at highest-duty-cycle power according to an indication instruction of the target application.

The highest-duty-cycle power may be 100%-duty-cycle power. After the target application is started, the electronic device detects the second broadcast signal from the second device through scanning at the highest-duty-cycle power, so that a success rate of detecting the second broadcast signal can be improved, and the second broadcast signal can be quickly detected.

In a possible implementation, the target application includes a road toll collection application, the target service includes a toll payment service, and the executing a target service corresponding to the target application includes: sending vehicle information corresponding to the electronic device to the second device, so that the second device sends the vehicle information to a server to calculate a to-be-paid toll, to execute the toll payment service; or sending vehicle information corresponding to the electronic device to a server, so that the server calculates a to-be-paid toll, to execute the toll payment service.

The road toll collection application may be an application installed on the electronic device, and may implement an automatic toll collection function on a highway. When the road toll collection application is used, a user may not need to install other hardware in a vehicle, to reduce hardware costs. It can be learned from the foregoing implementation that a process of establishing a communication connection between the road toll collection application and the second device does not require a user operation, so that an unconscious transaction process in a road toll collection process can be implemented, and user experience can be improved.

In a possible implementation, the target application includes a clock-in/out application, the target service includes a clock-in/out service, and the executing a target service corresponding to the target application includes: sending positioning information corresponding to the electronic device to the second device, so that the second device sends the positioning information to a server for verification, to execute the clock-in/out service; or sending positioning information corresponding to the electronic device to a server for verification, to execute the clock-in/out service.

The clock-in/out application may also be an application installed on the electronic device, and may implement an automatic clock-in/out function for a user. In an automatic clock-in/out process, no user operation is required, so that user experience is improved.

In a possible implementation, if the target service is not successfully executed when the electronic device arrives at an end point of the moving path, the method further includes: receiving biometric recognition information entered by a user by using the target application, and sending the biometric recognition information to the server to execute the target service.

In some scenarios, when the electronic device arrives at the end point of the moving path, for example, a vehicle driven by the user arrives at a toll gate, but the electronic device does not establish a connection to the second device or payment fails, the user may perform payment again by entering the biometric recognition information (such as a face image, a fingerprint, or an iris). In other words, a processing manner in a case of a service exception is considered, so that user experience is further improved.

In a possible implementation, the method further includes a process in which a user performs registration by using the target application: receiving registration information entered by the user by using the target application, where the registration information includes a user identifier and a target service identifier; and sending the registration information to a server for user registration.

The user identifier may be information that can uniquely identify the user, such as an ID card number or a mobile phone number. For a road toll payment service, the target service identifier may be information such as a license plate number. After the registration is completed, the server may further download a secure transaction environment (for example, a transaction TA or applet) and an identifier of a deployed device to the electronic device, to provide a data basis for a subsequent target service execution process.

According to a second aspect, an embodiment of this application provides an apparatus. The apparatus is included in an electronic device, and the apparatus has a function of implementing behavior of the electronic device in the first aspect and the possible implementations of the first aspect. The function may be implemented by using hardware, or may be implemented by using hardware executing corresponding software. The hardware or the software includes one or more modules or units corresponding to the foregoing function, for example, a receiving module or unit and a processing module or unit.

According to a third aspect, an embodiment of this application provides an electronic device. The electronic device includes a processor, a memory, and an interface. The processor, the memory, and the interface cooperate with each other, so that the electronic device performs any method in the technical solutions in the first aspect.

According to a fourth aspect, an embodiment of this application provides a chip, including a processor. The processor is configured to read and execute a computer program stored in a memory, to perform the method in any one of the first aspect and the possible implementations of the first aspect.

Optionally, the chip further includes the memory, and the memory is connected to the processor by using a circuit or a wire.

Optionally, the chip further includes a communication interface.

According to a fifth aspect, an embodiment of this application provides a computer-readable storage medium. The computer-readable storage medium stores a computer program, and when the computer program is executed by a processor, the processor is enabled to perform any method in the technical solutions in the first aspect.

According to a sixth aspect, an embodiment of this application provides a computer program product. The computer program product includes computer program code, and when the computer program code is run on an electronic device, the electronic device is enabled to perform any method in the technical solutions in the first aspect.

DESCRIPTION OF EMBODIMENTS

The following describes technical solutions in embodiments of this application with reference to the accompanying drawings in embodiments of this application. In the descriptions of embodiments of this application, "/" means "or", unless otherwise specified. For example, A/B may represent A or B. In this specification, "and/or" describes only an association relationship between associated objects and represents that three relationships may exist. For example, A and/or B may represent the following three cases: Only A exists, both A and B exist, and only B exists. In addition, in the descriptions of embodiments of this application, "a plurality of" means two or more.

The following terms "first", "second", and "third" are merely used for description, but should not be understood as indicating or implying relative importance or implying a quantity of indicated technical features. Therefore, a feature limited by "first", "second", or "third" may explicitly or implicitly include one or more features.

A target service execution method provided in embodiments of this application may be applied to an electronic device on which an application (application, app) can be installed, for example, a mobile phone, a tablet computer, a wearable device, a vehicle-mounted device, an augmented reality (augmented reality, AR)/virtual reality (virtual reality, VR) device, a notebook computer, an ultra-mobile personal computer (ultra-mobile personal computer, UMPC), a netbook, or a personal digital assistant (personal digital assistant, PDA). A specific type of the electronic device is not limited in embodiments of this application.

Figure 1:
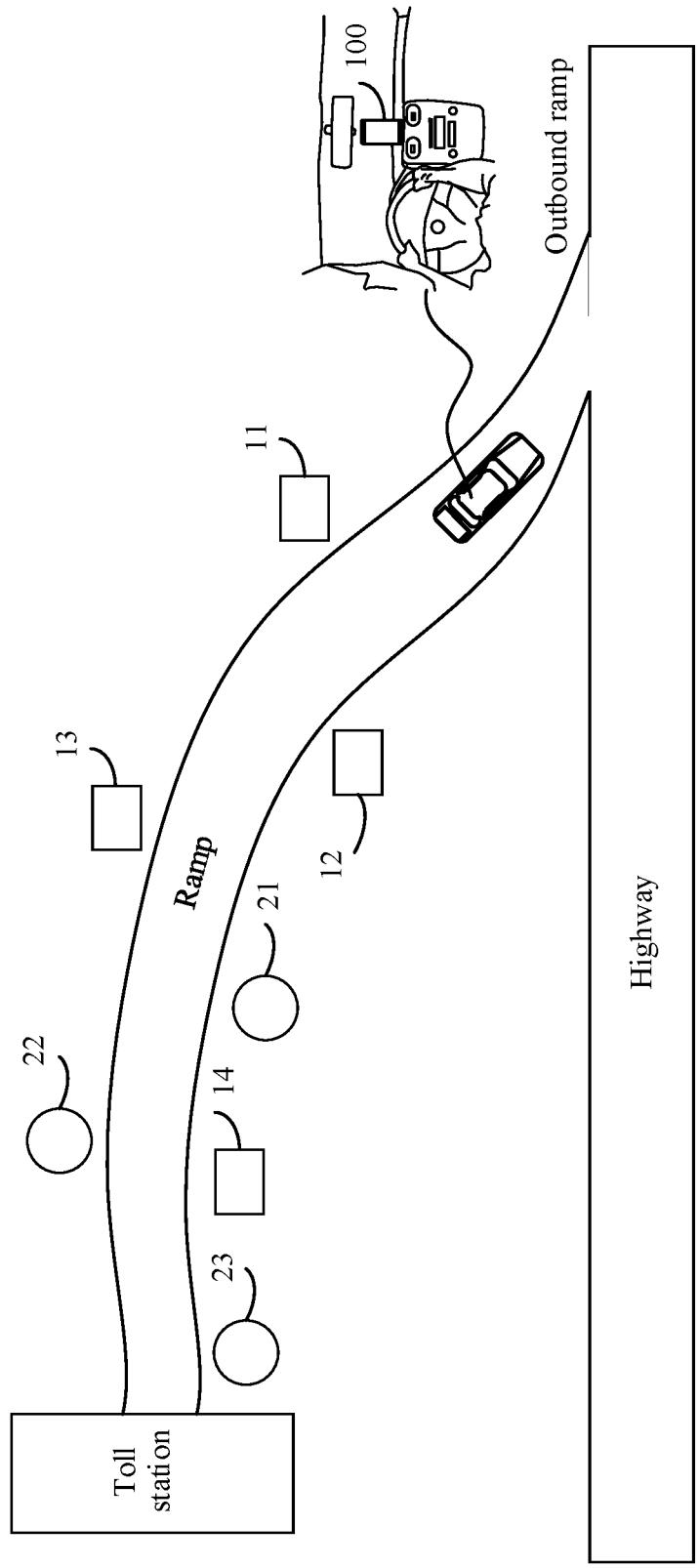
FIG. 1 is a diagram of an application scenario of an example target service execution method according to an embodiment of this application.

The target service execution method provided in embodiments of this application may be applied to a highway toll collection scenario shown in FIG. 1. It should be noted that FIG. 1 shows an example in which there are a total of four first devices: a first device 11, a first device 12, a first device 13, and a first device 14, and a total of three second devices: a second device 21, a second device 22, and a second device 23. However, specific quantities and an alternating sequence of first devices and second devices are not limited in embodiments. The first device and the second device each may be a Bluetooth device, or a device using another communication manner (for example, an ultra-wideband (ultra wide band, UWB) communication manner). The first device and the second device are deployed on a ramp in front of a toll station, and the first device is deployed closer to a highway than the second device on the ramp. When a user carrying an electronic device 100 drives a vehicle on the ramp in front of the toll station, the electronic device 100 may sense a broadcast signal from the first device, and start a road toll collection application installed on the electronic device 100. Then, the electronic device 100 continues to detect a broadcast signal from the second device, and establishes a connection to the second device after detecting the broadcast signal from the second device, to complete a toll payment process. It may be understood that a function of the first device is to wake up the road toll collection application on the electronic device 100, and a function of the second device is to establish a connection to the electronic device 100 to complete a transaction. In some embodiments, the first device and the second device each may alternatively be a composite device that integrates wake-up and transaction.

In some scenarios, for example, because a relatively small quantity of vehicles travel on the highway at night, to reduce power consumption of the first device and the second device and prolong a service life, the first device and the second device may be powered off in some time periods (for example, 0:00 to 5:00), and a power-on device 31 may be disposed at a front-most location on the ramp. The power-on device 31 may sense, by using an infrared signal or a vibration signal, that a vehicle passes, and trigger, when sensing that the vehicle passes, a power supply device (not shown in the figure) to power on the first device and the second device. For example, the power-on device 31 may send a power-on instruction to the power supply device, to instruct the power supply device to power on the first device and the second device. For another example, on a highway in a remote area, the power-on device 31 may also be disposed. Usually, the first device and the second device may be powered off. Only when sensing that a vehicle passes, the power-on device 31 triggers the power supply device to power on the first device and the second device. For a diagram of the scenario including the power-on device 31, refer to FIG. 2.

Figure 2:
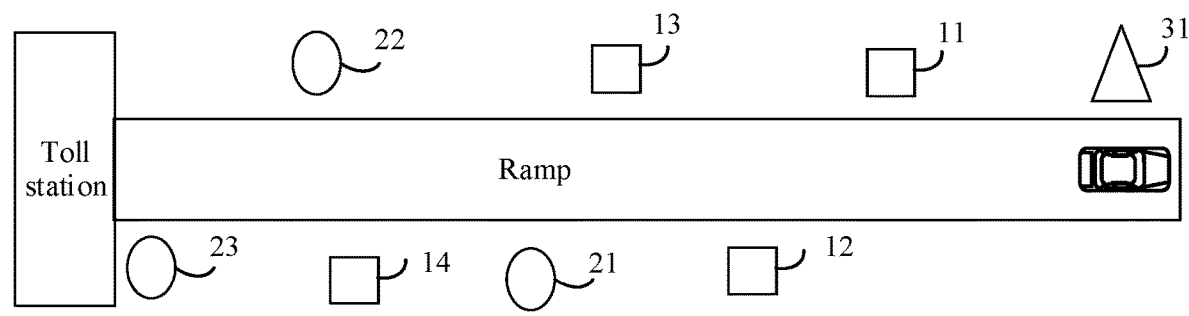
FIG. 2 is a diagram of an application scenario of another example target service execution method according to an embodiment of this application.
Figure 3:
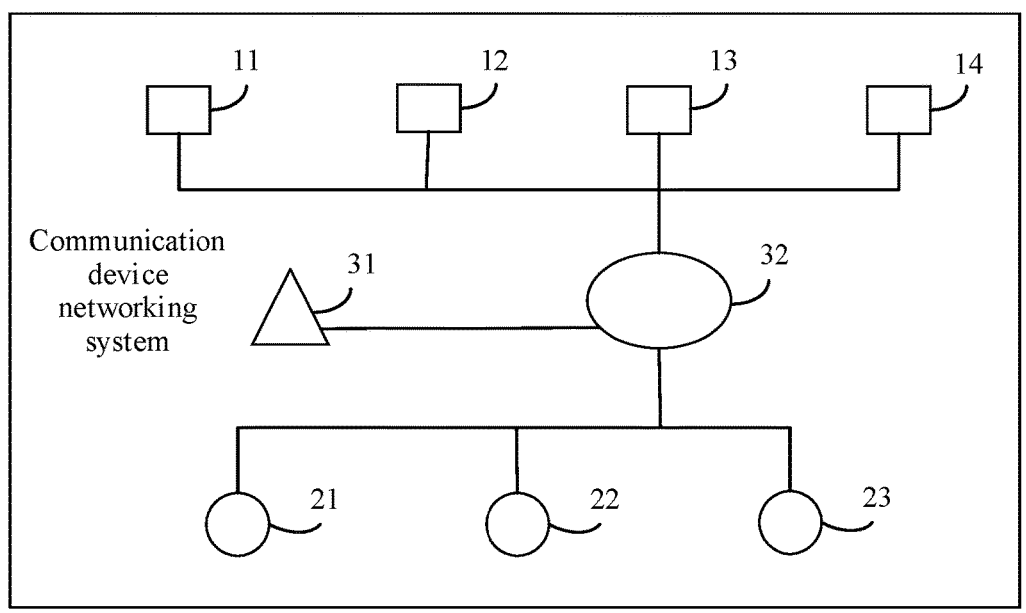
FIG. 3 is a schematic diagram of a structure of an example communication device networking system according to an embodiment of this application.

In the application scenario shown in FIG. 2, an embodiment of this application further provides a communication device networking system. For example, as shown in FIG. 3, the system includes a first device 11, a first device 12, a first device 13, a first device 14, a second device 21, a second device 22, a second device 23, a power-on device 31, and a power supply device 32. The first device 11, the first device 12, the first device 13, and the first device 14 are communicatively connected to the power supply device 32. The second device 21, the second device 22, and the second device 23 are also communicatively connected to the power supply device 32. The power-on device 31 is also communicatively connected to the power supply device 32. It should be noted that neither a quantity of first devices nor a quantity of second devices is limited in this embodiment of this application. When sensing, by using an infrared signal or a vibration signal, that a vehicle passes, the power-on device 31 sends a power-on instruction to the power supply device 32, to trigger the power supply device 32 to power on the first device and the second device.

Figure 4:
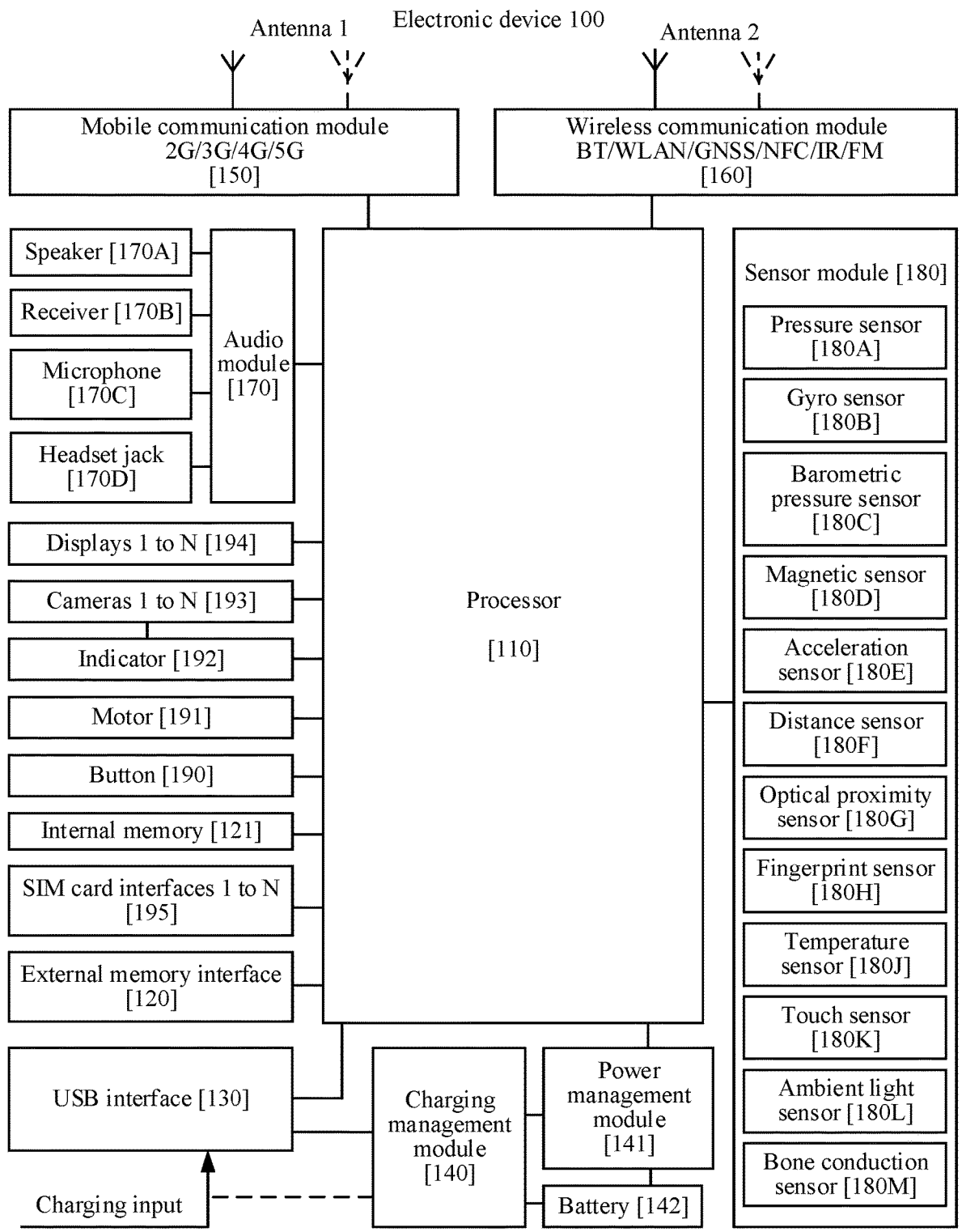
FIG. 4 is a schematic diagram of a structure of an example electronic device according to an embodiment of this application.

For example, FIG. 4 is a schematic diagram of a structure of an example electronic device 100 according to an embodiment of this application. The electronic device 100 may include a processor 110, an external memory interface 120, an internal memory 121, a universal serial bus (universal serial bus, USB) interface 130, a charging management module 140, a power management module 141, a battery 142, an antenna 1, an antenna 2, a mobile communication module 150, a wireless communication module 160, an audio module 170, a speaker 170A, a receiver 170B, a microphone 170C, a headset jack 170D, a sensor module 180, a button 190, a motor 191, an indicator 192, a camera 193, a display 194, a subscriber identification module (subscriber identification module, SIM) card interface 195, and the like. The sensor module 180 may include a pressure sensor 180A, a gyro sensor 180B, a barometric pressure sensor 180C, a magnetic sensor 180D, an acceleration sensor 180E, a distance sensor 180F, an optical proximity sensor 180G, a fingerprint sensor 180H, a temperature sensor 180J, a touch sensor 180K, an ambient light sensor 180L, a bone conduction sensor 180M, and the like.

It may be understood that the structure shown in this embodiment of this application does not constitute a specific limitation on the electronic device 100. In some other embodiments of this application, the electronic device 100 may include more or fewer components than those shown in the figure, or combine some components, or split some components, or have different component arrangements. The components shown in the figure may be implemented by hardware, software, or a combination of software and hardware.

The processor 110 may include one or more processing units. For example, the processor 110 may include an application processor (application processor, AP), a modem processor, a graphics processing unit (graphics processing unit, GPU), an image signal processor (image signal processor, ISP), a controller, a memory, a video codec, a digital signal processor (digital signal processor, DSP), a baseband processor, and/or a neural-network processing unit (neural-network processing unit, NPU). Different processing units may be independent components, or may be integrated into one or more processors.

The controller may be a nerve center and a command center of the electronic device 100. The controller may generate an operation control signal based on instruction operation code and a time sequence signal, to complete control of instruction fetching and instruction execution.

A memory may be further disposed in the processor 110, to store instructions and data. In some embodiments, the memory in the processor 110 is a cache. The memory may store instructions or data just used or cyclically used by the processor 110. If the processor 110 needs to use the instructions or data again, the instructions or data may be directly invoked from the memory. This avoids repeated access, and reduces waiting time of the processor 110, so that system efficiency is improved.

In some embodiments, the processor 110 may include one or more interfaces. The interface may include an inter-integrated circuit (inter-integrated circuit, I2C) interface, an inter-integrated circuit sound (inter-integrated circuit sound, I2S) interface, a pulse code modulation (pulse code modulation, PCM) interface, a universal asynchronous receiver/transmitter (universal asynchronous receiver/transmitter, UART) interface, a mobile industry processor interface (mobile industry processor interface, MIPI), a general-purpose input/output (general-purpose input/output, GPIO) interface, a subscriber identity module (subscriber identity module, SIM) interface, a universal serial bus (universal serial bus, USB) interface, and/or the like.

The I2C interface is a two-way synchronous serial bus, and includes a serial data line (serial data line, SDA) and a serial clock line (derail clock line, SCL). In some embodiments, the processor 110 may include a plurality of groups of I2C buses. The processor 110 may be separately coupled to the touch sensor 180K, a charger, a flash, the camera 193, and the like through different I2C bus interfaces. For example, the processor 110 may be coupled to the touch sensor 180K by using an I2C interface, so that the processor 110 communicates with the touch sensor 180K by using the I2C bus interface, to implement a touch function of the electronic device 100.

The I2S interface may be used for audio communication. In some embodiments, the processor 110 may include a plurality of groups of I2S buses. The processor 110 may be coupled to the audio module 170 by using the I2S bus, to implement communication between the processor 110 and the audio module 170. In some embodiments, the audio module 170 may transmit an audio signal to the wireless communication module 160 through the I2S interface, to implement a function of answering a call by using a Bluetooth headset.

The PCM interface may be configured to perform audio communication, and sample, quantize, and code analog signals. In some embodiments, the audio module 170 may be coupled to the wireless communication module 160 by using a PCM bus interface. In some embodiments, the audio module 170 may also transmit an audio signal to the wireless communication module 160 through the PCM interface, to implement a function of answering a call by using a Bluetooth headset. Both the I2S interface and the PCM interface may be used for audio communication.

The UART interface is a universal serial data bus, and is used for asynchronous communication. The bus may be a two-way communication bus. The bus converts to-be-transmitted data between serial communication and parallel communication. In some embodiments, the UART interface is usually configured to connect the processor 110 to the wireless communication module 160. For example, the processor 110 communicates with a Bluetooth module in the wireless communication module 160 by using the UART interface, to implement a Bluetooth function. In some embodiments, the audio module 170 may transmit an audio signal to the wireless communication module 160 through the UART interface, to implement a function of playing music by using a Bluetooth headset.

The MIPI interface may be configured to connect the processor 110 to a peripheral component such as the display 194 or the camera 193. The MIPI interface includes a camera serial interface (camera serial interface, CSI), a display serial interface (display serial interface, DSI), and the like.

In some embodiments, the processor 110 and the camera 193 communicate with each other by using the CSI interface, to implement a photographing function of the electronic device 100. The processor 110 communicates with the display 194 by using the DSI interface, to implement a display function of the electronic device 100.

The GPIO interface may be configured by using software. The GPIO interface may be configured as a control signal, or may be configured as a data signal. In some embodiments, the GPIO interface may be configured to connect the processor 110 to the camera 193, the display 194, the wireless communication module 160, the audio module 170, the sensor module 180, and the like. The GPIO interface may alternatively be configured as the I2C interface, the I2S interface, the UART interface, the MIPI interface, or the like.

The USB interface 130 is an interface conforming to a USB standard specification, and may be specifically a mini USB interface, a micro USB interface, a USB Type-C interface, or the like. The USB interface 130 may be configured to connect to a charger to charge the electronic device 100, or may be configured to transmit data between the electronic device 100 and a peripheral device, or may be configured to connect to a headset to play audio by using the headset. The interface may alternatively be configured to connect to another electronic device, such as an AR device.

It may be understood that the interface connection relationship between the modules shown in this embodiment of this application is merely an example, and does not constitute a limitation on the structure of the electronic device 100. In some other embodiments of this application, the electronic device 100 may alternatively use an interface connection manner different from that in the foregoing embodiment, or a combination of a plurality of interface connection manners.

The charging management module 140 is configured to receive charging input from a charger. The charger may be a wireless charger, or may be a wired charger. In some wired charging embodiments, the charging management module 140 may receive charging input from a wired charger through the USB interface 130. In some wireless charging embodiments, the charging management module 140 may receive wireless charging input through a wireless charging coil of the electronic device 100. When charging the battery 142, the charging management module 140 may further supply power to the electronic device through the power management module 141.

The power management module 141 is configured to connect the battery 142, the charging management module 140, and the processor 110. The power management module 141 receives input from the battery 142 and/or the charging management module 140, and supplies power to the processor 110, the internal memory 121, the external memory, the display 194, the camera 193, the wireless communication module 160, and the like. The power management module 141 may be further configured to monitor parameters such as a battery capacity, a battery cycle count, and a battery health status (leakage or impedance). In some other embodiments, the power management module 141 may alternatively be disposed in the processor 110. In some other embodiments, the power management module 141 and the charging management module 140 may alternatively be disposed in a same component.

A wireless communication function of the electronic device 100 may be implemented by using the antenna 1, the antenna 2, the mobile communication module 150, the wireless communication module 160, the modem processor, the baseband processor, and the like.

The antenna 1 and the antenna 2 are configured to transmit and receive electromagnetic wave signals. Structures of the antenna 1 and the antenna 2 in FIG. 4 are merely examples. Each antenna in the electronic device 100 may be configured to cover one or more communication bands. Different antennas may be multiplexed to improve antenna utilization. For example, the antenna 1 may be multiplexed into a diversity antenna of a wireless local area network. In some other embodiments, the antenna may be used in combination with a tuning switch.

The mobile communication module 150 may provide a solution for wireless communication, including 2G/3G/4G/5G and the like, that is applied to the electronic device 100. The mobile communication module 150 may include at least one filter, a switch, a power amplifier, a low noise amplifier (low noise amplifier, LNA), and the like. The mobile communication module 150 may receive an electromagnetic wave by using the antenna 1, perform processing such as filtering and amplification on the received electromagnetic wave, and send a processed electromagnetic wave to the modem processor for demodulation. The mobile communication module 150 may further amplify a signal modulated by the modem processor, and convert the signal into an electromagnetic wave for radiation through the antenna 1. In some embodiments, at least some function modules of the mobile communication module 150 may be disposed in the processor 110. In some embodiments, at least some function modules of the mobile communication module 150 may be disposed in a same component as at least some modules of the processor 110.

The modem processor may include a modulator and a demodulator. The modulator is configured to adjust a to-be-sent low-frequency baseband signal to a medium/high-frequency signal. The demodulator is configured to demodulate a received electromagnetic wave signal into a low-frequency baseband signal. Then, the demodulator transmits the low-frequency baseband signal obtained through demodulation to the baseband processor for processing. After being processed by the baseband processor, the low-frequency baseband signal is transmitted to the application processor. The application processor outputs a sound signal by using an audio device (which is not limited to the speaker 170A, the receiver 170B, or the like), or displays an image or a video by using the display 194. In some embodiments, the modem processor may be an independent device. In some other embodiments, the modem processor may be independent of the processor 110 and disposed in a same device as the mobile communication module 150 or another function module.

The wireless communication module 160 may provide a solution for wireless communication that is applied to the electronic device 100 and that includes a wireless local area network (wireless local area networks, WLAN) (such as a wireless fidelity (wireless fidelity, Wi-Fi) network), Bluetooth (Bluetooth, BT), a global navigation satellite system (global navigation satellite system, GNSS), frequency modulation (frequency modulation, FM), near field communication (near field communication, NFC), an infrared (infrared, IR) technology, and the like. The wireless communication module 160 may be one or more components that integrate at least one communication processing module. The wireless communication module 160 receives an electromagnetic wave through the antenna 2, performs frequency modulation and filtering on an electromagnetic wave signal, and sends a processed signal to the processor 110.

The wireless communication module 160 may further receive a to-be-sent signal from the processor 110, perform frequency modulation and amplification on the to-be-sent signal, and convert the to-be-sent signal into an electromagnetic wave for radiation through the antenna 2.

In some embodiments, in the electronic device 100, the antenna 1 is coupled to the mobile communication module 150, and the antenna 2 is coupled to the wireless communication module 160, so that the electronic device 100 can communicate with a network and another device according to a wireless communication technology. The wireless communication technology may include a global system for mobile communications (global system for mobile communications, GSM), a general packet radio service (general packet radio service, GPRS), code division multiple access (code division multiple access, CDMA), wideband code division multiple access (wideband code division multiple access, WCDMA), time-division code division multiple access (time-division code division multiple access, TD-SCDMA), long term evolution (long term evolution, LTE), BT, GNSS, WLAN, NFC, FM, an IR technology, and/or the like. The GNSS may include a global positioning system (global positioning system, GPS), a global navigation satellite system (global navigation satellite system, GLO-NASS), a BeiDou navigation satellite system (BeiDou navigation satellite system, BDS), a quasi-zenith satellite system (quasi-zenith satellite system, QZSS), and/or a satellite based augmentation system (satellite based augmentation systems, SBAS).

The electronic device 100 implements a display function by using the GPU, the display 194, the application processor, and the like. The GPU is a microprocessor for image processing, and is connected to the display 194 and the application processor. The GPU is configured to perform mathematical and geometric calculation and render graphics. The processor 110 may include one or more GPUs that execute program instructions to generate or change display information.

The display 194 is configured to display an image, a video, and the like. The display 194 includes a display panel. The display panel may be a liquid crystal display (liquid crystal display, LCD), an organic light-emitting diode (organic light-emitting diode, OLED), an active-matrix organic light-emitting diode (active-matrix organic light-emitting diode, AMOLED), a flexible light-emitting diode (flexible light-emitting diode, FLED), a mini-LED, a micro-LED, a micro-OLED, a quantum dot light-emitting diode (quantum dot light-emitting diode, QLED), or the like. In some embodiments, the electronic device 100 may include one or N displays 194, where N is a positive integer greater than 1.

The electronic device 100 may implement a photographing function by using the ISP, the camera 193, the video codec, the GPU, the display 194, the application processor, and the like.

The ISP is configured to process data fed back by the camera 193. For example, during photographing, a shutter is pressed, light is transmitted to a photosensitive element of the camera through a lens, an optical signal is converted into an electrical signal, and the photosensitive element of the camera transmits the electrical signal to the ISP for processing, to convert the electrical signal into a visible image. The ISP may further perform algorithm optimization on noise, luminance, and complexion of the image. The ISP may further optimize parameters such as exposure and a color temperature of a photographing scenario. In some embodiments, the ISP may be disposed in the camera 193.

The camera 193 is configured to capture a still image or a video. An optical image of an object is generated by using a lens and projected onto a photosensitive element. The photosensitive element may be a charge coupled device (charge coupled device, CCD) or a complementary metal-oxide-semiconductor (complementary metal-oxide-semiconductor, CMOS) phototransistor. The photosensitive element converts an optical signal into an electrical signal, and then transmits the electrical signal to the ISP for conversion into a digital image signal. The ISP outputs the digital image signal to the DSP for processing. The DSP converts the digital image signal into a standard image signal in a format such as RGB or YUV. In some embodiments, the electronic device 100 may include one or N cameras 193, where N is a positive integer greater than 1.

The digital signal processor is configured to process a digital signal. In addition to processing a digital image signal, the digital signal processor may further process another digital signal. For example, when the electronic device 100 selects a frequency, the digital signal processor is configured to perform Fourier transform or the like on frequency energy.

The video codec is configured to compress or decompress a digital video. The electronic device 100 may support one or more types of video codecs. In this way, the electronic device 100 may play or record videos in a plurality of coding formats, for example, moving picture experts group (moving picture experts group, MPEG)-1, MPEG-2, MPEG-3, and MPEG-4.

The NPU is a neural-network (neural-network, NN) computing processor that processes input information rapidly by referring to a structure of a biological neural network, for example, by referring to a transmission mode between human brain neurons, and can further perform self-learning continuously. The NPU may be used to implement applications such as intelligent cognition of the electronic device 100, for example, image recognition, facial recognition, voice recognition, and text understanding.

The external memory interface 120 may be configured to connect to an external memory card, such as a micro SD card, to extend a storage capability of the electronic device 100. The external memory card communicates with the processor 110 by using the external memory interface 120, to implement a data storage function. For example, files such as music or videos are stored in the external memory card.

The internal memory 121 may be configured to store computer executable program code, where the executable program code includes instructions. The processor 110 performs various function applications and data processing of the electronic device 100 by running the instructions stored in the internal memory 121. The internal memory 121 may include a program storage area and a data storage area. The program storage area may store an operating system, an application program required by at least one function (for example, a sound play function or an image play function), and the like. The data storage area may store data (such as audio data or a phone book) created in a use process of the electronic device 100. In addition, the internal memory 121 may include a high-speed random access memory, and may further include a non-volatile memory, such as at least one magnetic disk storage component, a flash memory component, and a universal flash storage (universal flash storage, UFS).

The electronic device 100 may implement an audio function, such as music playing and recording, by using the audio module 170, the speaker 170A, the receiver 170B, the microphone 170C, the headset jack 170D, the application processor, and the like.

The audio module 170 is configured to convert digital audio information into an analog audio signal for output, and is also configured to convert analog audio input into a digital audio signal. The audio module 170 may be further configured to encode and decode audio signals. In some embodiments, the audio module 170 may be disposed in the processor 110, or some function modules of the audio module 170 may be disposed in the processor 110.

The speaker 170A, also referred to as a "loudspeaker", is configured to convert an audio electrical signal into a sound signal. The electronic device 100 may be used to listen to music or answer a call in a hands-free mode over the speaker 170A.

The receiver 170B, also referred to as an "earpiece", is configured to convert an audio electrical signal into a sound signal. When a call is answered or audio information is listened to by using the electronic device 100, the receiver 170B may be put close to a human ear to listen to a voice.

The microphone 170C, also referred to as a "mike" or a "mic", is configured to convert a sound signal into an electrical signal. When making a call or sending a voice message, the user may make a sound near the microphone 170C through the mouth, to enter a sound signal to the microphone 170C. At least one microphone 170C may be disposed on the electronic device 100. In some other embodiments, two microphones 170C may be disposed on the electronic device 100. In addition to sound signal collection, a noise reduction function may be further implemented. In some other embodiments, three, four, or more microphones 170C may be alternatively disposed on the electronic device 100, to collect a sound signal, implement noise reduction, recognize a sound source, implement a directional recording function, and the like.

The headset jack 170D is configured to connect to a wired headset. The headset jack 170D may be the USB interface 130, or may be a 3.5 mm open mobile terminal platform (open mobile terminal platform, OMTP) standard interface or a cellular telecommunications industry association of the USA (cellular telecommunications industry association of the USA, CTIA) standard interface.

The pressure sensor 180A is configured to sense a pressure signal, and may convert the pressure signal into an electrical signal. In some embodiments, the pressure sensor 180A may be disposed on the display 194. There are many types of pressure sensors 180A, such as a resistive pressure sensor, an inductive pressure sensor, and a capacitive pressure sensor. The capacitive pressure sensor may include at least two parallel plates made of conductive materials. When a force is applied to the pressure sensor 180A, capacitance between electrodes changes. The electronic device 100 determines strength of the pressure based on the change of the capacitance. When a touch operation is performed on the display 194, the electronic device 100 detects strength of the touch operation through the pressure sensor 180A. The electronic device 100 may also calculate a position of the touch based on a detection signal of the pressure sensor 180A. In some embodiments, touch operations performed on a same touch position but has different touch operation strength may correspond to different operation instructions. For example, when a touch operation whose touch operation strength is less than a first pressure threshold is applied to a Messages icon, an instruction for viewing an SMS message is executed. When a touch operation whose touch operation strength is greater than or equal to the first pressure threshold is applied to the Messages icon, an instruction for creating an SMS message is executed.

The gyro sensor 180B may be configured to determine a motion gesture of the electronic device 100. In some embodiments, angular velocities of the electronic device 100 around the three axes (that is, the x-axis, the y-axis, and the z-axis) may be determined by using the gyro sensor 180B. The gyro sensor 180B may be used for image stabilization during photographing. For example, when a shutter is pressed, the gyro sensor 180B detects a jittering angle of the electronic device 100, calculates, based on the angle, a distance for which a lens module needs to compensate, and enables the lens to offset jittering of the electronic device 100 through reverse motion, so as to implement image stabilization. The gyro sensor 180B may be further used in a navigation scenario and a motion-controlled gaming scenario.

The barometric pressure sensor 180C is configured to measure barometric pressure. In some embodiments, the electronic device 100 calculates an altitude based on a barometric pressure value measured by the barometric pressure sensor 180C, to assist in positioning and navigation.

The magnetic sensor 180D includes a Hall sensor. The electronic device 100 may detect opening and closing of a flip cover by using the magnetic sensor 180D. In some embodiments, when the electronic device 100 is a flip phone, the electronic device 100 may detect opening and closing of a flip cover based on the magnetic sensor 180D. Further, a feature such as automatic unlocking upon opening of the flip cover is set based on a detected opening or closing state of the flip cover.

The acceleration sensor 180E may detect values of acceleration of the electronic device 100 in all directions (usually on three axes). When the electronic device 100 is static, the acceleration sensor 180E may detect magnitude and a direction of gravity. The acceleration sensor 180E may be further configured to recognize a posture of the electronic device, and is applied to an application such as switching between landscape mode and vertical mode and a pedometer.

The distance sensor 180F is configured to measure a distance. The electronic device 100 may measure a distance through infrared or laser. In some embodiments, in a photographing scenario, the electronic device 100 may measure a distance by using the distance sensor 180F, to implement quick focusing.

The optical proximity sensor 180G may include, for example, a light-emitting diode (LED) and a light detector such as a photodiode. The light-emitting diode may be an infrared light-emitting diode. The electronic device 100 emits infrared light by using the light-emitting diode. The electronic device 100 detects infrared reflected light from a nearby object by using the photodiode. When sufficient reflected light is detected, the electronic device 100 may determine that there is an object near the electronic device 100. When insufficient reflected light is detected, the electronic device 100 may determine that there is no object near the electronic device 100. The electronic device 100 may detect, by using the optical proximity sensor 180G, that a user holds the electronic device 100 close to the ear for a call, to automatically turn off a screen to save power. The optical proximity sensor 180G may also be used in a flip cover mode or a pocket mode to automatically perform screen unlocking or locking.

The ambient light sensor 180L is configured to sense ambient light brightness. The electronic device 100 may adaptively adjust brightness of the display 194 based on the sensed ambient light brightness. The ambient light sensor 180L may also be configured to automatically adjust a white balance during photographing. The ambient light sensor 180L may further cooperate with the optical proximity sensor 180G to detect whether the electronic device 100 is in a pocket, to prevent an accidental touch.

The fingerprint sensor 180H is configured to collect a fingerprint. The electronic device 100 may implement fingerprint-based unlocking, application lock access, fingerprint-based photographing, fingerprint-based call answering, or the like based on a feature of the collected fingerprint.

The temperature sensor 180J is configured to detect a temperature. In some embodiments, the electronic device 100 executes a temperature processing policy based on the temperature detected by the temperature sensor 180J. For example, when the temperature reported by the temperature sensor 180J exceeds a threshold, the electronic device 100 reduces performance of a processor near the temperature sensor 180J, to reduce power consumption and implement thermal protection. In some other embodiments, when the temperature is lower than another threshold, the electronic device 100 heats the battery 142 to avoid abnormal shutdown of the electronic device 100 that is caused due to a low temperature. In some other embodiments, when the temperature is lower than still another threshold, the electronic device 100 boosts an output voltage of the battery 142, to avoid an abnormal shutdown caused by a low temperature.

The touch sensor 180K is also referred to as a "touch panel". The touch sensor 180K may be disposed on the display 194. The touch sensor 180K and the display 194 form a touchscreen, which is also referred to as a "touch screen". The touch sensor 180K is configured to detect a touch operation performed on or near the touch sensor. The touch sensor may transfer the detected touch operation to the application processor to determine a type of a touch event. Visual output related to the touch operation may be provided by using the display 194. In some other embodiments, the touch sensor 180K may alternatively be disposed on a surface of the electronic device 100 at a position different from that of the display 194.

The bone conduction sensor 180M may obtain a vibration signal. In some embodiments, the bone conduction sensor 180M may obtain a vibration signal of a vibration bone of a human vocal cord part. The bone conduction sensor 180M may also be in contact with a human pulse, and receive a blood pressure beating signal. In some embodiments, the bone conduction sensor 180M may alternatively be disposed in the headset, to form a bone conduction headset. The audio module 170 may obtain a voice signal through parsing based on the vibration signal, of the vibration bone of the vocal cord part, obtained by the bone conduction sensor 180M, to implement a voice function. The application processor may parse heart rate information based on the blood pressure beating signal obtained by the bone conduction sensor 180M, to implement a heart rate detection function.

The button 190 includes a power button, a volume button, and the like. The button 190 may be a mechanical button, or may be a touch button. The electronic device 100 may receive button input, and generate button signal input related to user settings and function control of the electronic device 100.

The motor 191 may generate a vibration prompt. The motor 191 may be used for an incoming call vibration prompt, or may be used for touch vibration feedback. For example, touch operations performed on different applications (for example, photo taking and audio playing) may be corresponding to different vibration feedback effects. The motor 191 may also correspond to different vibration feedback effects for touch operations performed in different regions of the display 194. Different application scenarios (for example, a time reminder, information receiving, an alarm clock, and a game) may also be corresponding to different vibration feedback effects. A touch vibration feedback effect may be further customized.

The indicator 192 may be an indicator light, and may be used to indicate a charging status or a power change, or may be used to indicate a message, a missed call, a notification, or the like.

The SIM card interface 195 is configured to connect to a SIM card. The SIM card may be inserted into the SIM card interface 195 or pulled out of the SIM card interface 195, to implement contact with or separation from the electronic device 100. The electronic device 100 may support one or N SIM card interfaces, and N is a positive integer greater than 1. The SIM card interface 195 can support a nano-SIM card, a micro-SIM card, a SIM card, and the like. A plurality of cards may be simultaneously inserted into a same SIM card interface 195. The plurality of cards may be of a same type or different types. The SIM card interface 195 may also be compatible with different types of SIM cards. The SIM card interface 195 may also be compatible with an external memory card. The electronic device 100 interacts with a network by using a SIM card, to implement functions such as conversation and data communication. In some embodiments, the electronic device 100 uses an eSIM, namely, an embedded SIM card. The eSIM card may be embedded in the electronic device 100, and cannot be separated from the electronic device 100.

A software system of the electronic device 100 may use a layered architecture, an event-driven architecture, a microkernel architecture, a micro-service architecture, or a cloud architecture. In embodiments of this application, an Android system with a layered architecture is used as an example to describe the software structure of the electronic device 100.

Figure 5:
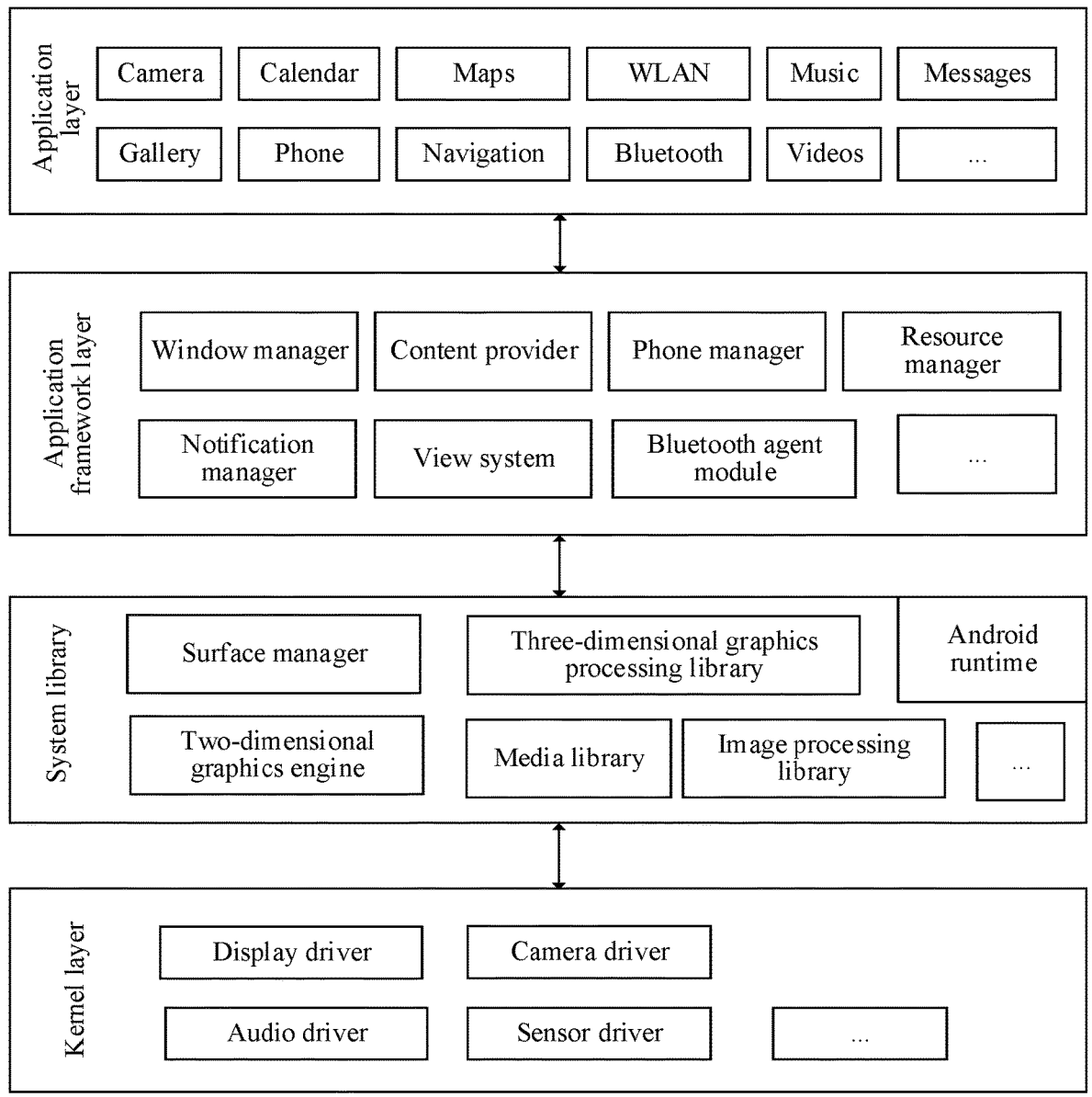
FIG. 5 is a block diagram of a software structure of an electronic device according to an embodiment of this application.

FIG. 5 is a block diagram of a software structure of the electronic device 100 according to an embodiment of this application. In a layered architecture, software is divided into several layers, and each layer has a clear role and task. The layers communicate with each other through a software interface. In some embodiments, an Android system is divided into four layers: an application layer, an application framework layer, an Android runtime (Android runtime) and system library, and a kernel layer from top to bottom. The application layer may include a series of application packages.

As shown in FIG. 5, the application packages may include applications such as Camera, Gallery, Calendar, Phone, Maps, Navigation, WLAN, Bluetooth, Music, Videos, and Messages.

The application framework layer provides an application programming interface (application programming interface, API) and a programming framework for applications at the application layer. The application framework layer includes some predefined functions.

As shown in FIG. 5, the application framework layer may include a window manager, a content provider, a view system, a phone manager, a resource manager, a notification manager, a Bluetooth agent module, and the like.

The window manager is configured to manage window programs. The window manager may obtain a display size, determine whether there is a status bar, lock a screen, take a screenshot, and the like.

The content provider is configured to store and obtain data and make the data accessible to the application. The data may include videos, images, audio, calls that are made and received, browsing history and bookmarks, a phone book, and the like.

The view system includes visual controls, such as a text display control and a picture display control. The view system may be configured to construct an application. A display interface may include one or more views. For example, a display interface including an SMS notification icon may include a text display view and a picture display view.

The phone manager is configured to provide a communication function of the electronic device 100, for example, call status management (including accepting and declining).

The resource manager provides various resources for the application, such as a localized string, an icon, a picture, a layout file, and a video file.

The notification manager enables the application to display notification information in a status bar, and may be configured to transfer a message of a notification type. The information may automatically disappear after a short stay without user interaction. For example, the notification manager is configured to notify a download completion, a message reminder, and the like. The notification manager may alternatively be a notification that appears in a form of a graph or a scroll bar text in a status bar at the top of the system, for example, a notification of an application running in the background, or may be a notification that appears in a form of a dialog window on a screen. For example, the status bar shows text information, a prompt tone is made, the electronic device vibrates, and an indicator flickers.

The Bluetooth agent module is configured to wake up a target application after a Bluetooth chip senses a broadcast signal from a first device.

The Android runtime includes a kernel library and a virtual machine. The Android runtime is responsible for scheduling and management of the Android system.

The kernel library includes two parts: a function that needs to be invoked by using the Java language, and a kernel library of Android.

The application layer and the application framework layer run in the virtual machine. The virtual machine executes a binary file of a Java file at the application layer and the application framework layer. The virtual machine is configured to perform functions such as object lifecycle management, stack management, thread management, security and abnormity management, and garbage collection.

The system library may include a plurality of function modules, for example, a surface manager (surface manager), a media library (media libraries), a three-dimensional graphics processing library (for example, OpenGL ES), and a 2D graphics engine (for example, SGL).

The surface manager is configured to manage a display subsystem and provide fusion of 2D and 3D layers for a plurality of applications.

The media library supports playback and recording in a plurality of commonly used audio and video formats, and static image files. The media library may support a plurality of audio and video coding formats, such as MPEG-4, H.264, MP3, AAC, AMR, JPG, and PNG.

The three-dimensional graphics processing library is configured to implement three-dimensional graphics drawing, image rendering, composition, layer processing, and the like.

The 2D graphics engine is a drawing engine for 2D drawing.

The kernel layer is a layer between hardware and software. The kernel layer includes at least a display driver, a camera driver, an audio driver, and a sensor driver.

For ease of understanding, in the following embodiments of this application, an electronic device having the structures shown in FIG. 4 and FIG. 5 is used as an example to specifically describe the target service execution method in embodiments of this application with reference to the accompanying drawings and application scenarios.

Figure 6:
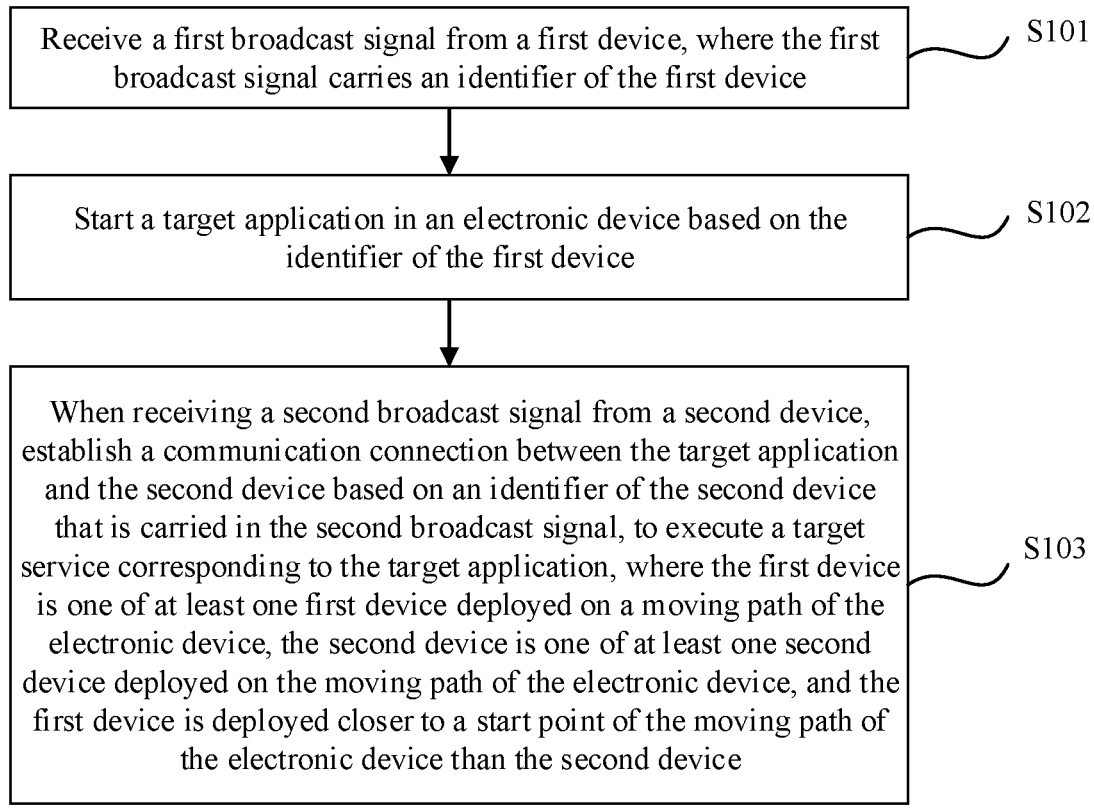
FIG. 6 is a schematic flowchart of an example target service execution method according to an embodiment of this application.

In the scenario shown in FIG. 1 or FIG. 2, when a user carrying an electronic device drives a vehicle to a signal coverage area of a first device deployed on a ramp, method steps in the following embodiment may be performed. FIG. 6 is a schematic flowchart of an example target service execution method according to an embodiment of this application. The method includes the following steps.

S101: Receive a first broadcast signal from a first device, where the first broadcast signal carries an identifier of the first device.

The first device may be a Bluetooth device, for example, a Bluetooth low energy (Bluetooth low energy, BLE) device. The first device continuously transmits the first broadcast signal in a power-on state, and the first broadcast signal carries the identifier of the first device, to identify information such as a location (for example, distinguishing between toll stations or distinguishing between an inbound ramp and an outbound ramp) and a function (for example, a wake-up function) of the first device. After a Bluetooth function (or another communication function) of an electronic device is enabled, the electronic device may scan the first broadcast signal at normal-duty-cycle (for example, 5%) power, and receive the first broadcast signal from the first device when the electronic device is in a signal coverage area of the first device.

S102: Start a target application in the electronic device based on the identifier of the first device.

In a highway toll collection scenario, the target application may be a road toll collection application (APP). A user needs to download the application to the electronic device and perform registration in advance. Then, a road toll collection server may send identifiers of all devices deployed in the highway toll collection scenario to the electronic device for storage. In this case, after receiving a first broadcast signal from a first device, the electronic device may compare an identifier of the first device with a prestored device identifier set. If an identifier that matches the identifier of the first device exists in the device identifier set, the electronic device may determine that the received first broadcast signal is a "real" signal for waking up the target application, and start the target application in the electronic device. In other words, in this case, the target application is switched from a sleep state to an active state. It should be noted that the first device may be configured to only start the target application in the electronic device, but does not establish a communication connection to the electronic device.

S103: When receiving a second broadcast signal from a second device, establish a communication connection between the target application and the second device based on an identifier of the second device that is carried in the second broadcast signal, to execute a target service corresponding to the target application, where the first device is one of at least one first device deployed on a moving path of the electronic device, the second device is one of at least one second device deployed on the moving path of the electronic device, and the first device is deployed closer to a start point of the moving path of the electronic device than the second device.

Specifically, the second device (for example, a Bluetooth device) deployed behind the first device continuously transmits the second broadcast signal in a power-on state. After the electronic device starts the target application, if the electronic device receives the second broadcast signal from the second device, the electronic device may also compare the identifier of the second device that is carried in the second broadcast signal with the device identifier set. If an identifier that matches the identifier of the second device exists in the device identifier set, the electronic device may determine that the received second broadcast signal is a "real" signal for transaction connection, and establish the communication connection between the target application and the second device, to execute the target service corresponding to the target application, for example, a toll payment service corresponding to the road toll collection application, to complete an unconscious transaction process in the highway toll collection scenario.

It should be noted that the moving path of the electronic device is a traveling path of a vehicle, that is, a ramp path in FIG. 1. The first device is one of the at least one first device on the path, the second device is one of the at least one second device on the path, and the first device is deployed closer to the start point of the path than the second device. For example, in the scenario shown in FIG. 1, the first broadcast signal received by the electronic device in this embodiment may be transmitted by the first device 11, and the received second broadcast signal may be transmitted by the second device 22. To be specific, after the first device 11 wakes up the target application in the electronic device, the second device 22 establishes a communication connection to the target application to execute the target service.

It may be understood that, after the second device establishes the communication connection to the target application, the target application may send, to the second device, task information required for executing the target service, the second device further sends the task information to a server, and the server may return a verification result to the electronic device after verifying the task information, to execute the target service. Alternatively, the target application may directly send, to a server, task information required for executing the target service, and the server returns a verification result to the electronic device after verifying the task information, to execute the target service.

In the foregoing target service execution method, the first device is deployed closer to the start point of the moving path of the electronic device than the second device, and the first device first starts the target application in the electronic device, to ensure that the target application is started before the connection to the second device is established, and then improve a success rate of establishing a connection between the electronic device and the second device, to improve a success rate of completing the target service.

Figure 7:
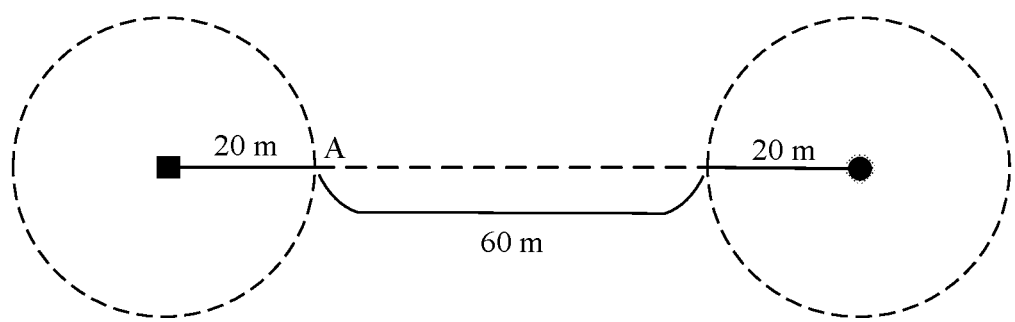
FIG. 7 is a schematic diagram of an example of setting a deployment distance between a first device and a second device according to an embodiment of this application.

In a possible implementation, to further ensure that the target application is started before the connection to the second device is established, a deployment distance between the first device and the second device may be determined based on the signal coverage area of the first device, a signal coverage area of the second device, startup duration of the target application, and a moving speed of the electronic device. For example, as shown in FIG. 7, it is assumed that the signal coverage areas of both the first device and the second device have a diameter of 40 meters (m). In a worst case, the electronic device does not receive the first broadcast signal from the first device until arriving at an edge point A of the signal coverage area of the first device, and then begins to start the target application. Usually, the startup duration of the target application is 3 to 5 seconds (s). For example, if the startup duration is 4s and the moving speed of the electronic terminal is 15 meters/second (m/s), the electronic terminal completes startup of the target application after moving 60 m. Then, if the electronic device enters the signal coverage area of the second device after the target application is started, a success rate of establishing a connection between the electronic device and the second device can be greatly improved. In this case, the deployment distance between the first device and the second device needs to be greater than 20+60+20 m. After the electronic terminal enters the signal coverage area of the second device, it usually takes only 1s to establish a connection to the second device and execute the target service. In this case, the electronic terminal moves about only 15 m, and is still in the signal coverage area of the second device. Therefore, reliability of an entire process is improved. With reference to the scenario diagram shown in FIG. 1, for each first device, there should be at least one second device whose distance from the first device is greater than 100 m, so that when the last first device successfully starts the target application in the electronic device, it is ensured that a corresponding second device can successfully establish a communication connection to the electronic device.

Figure 8:
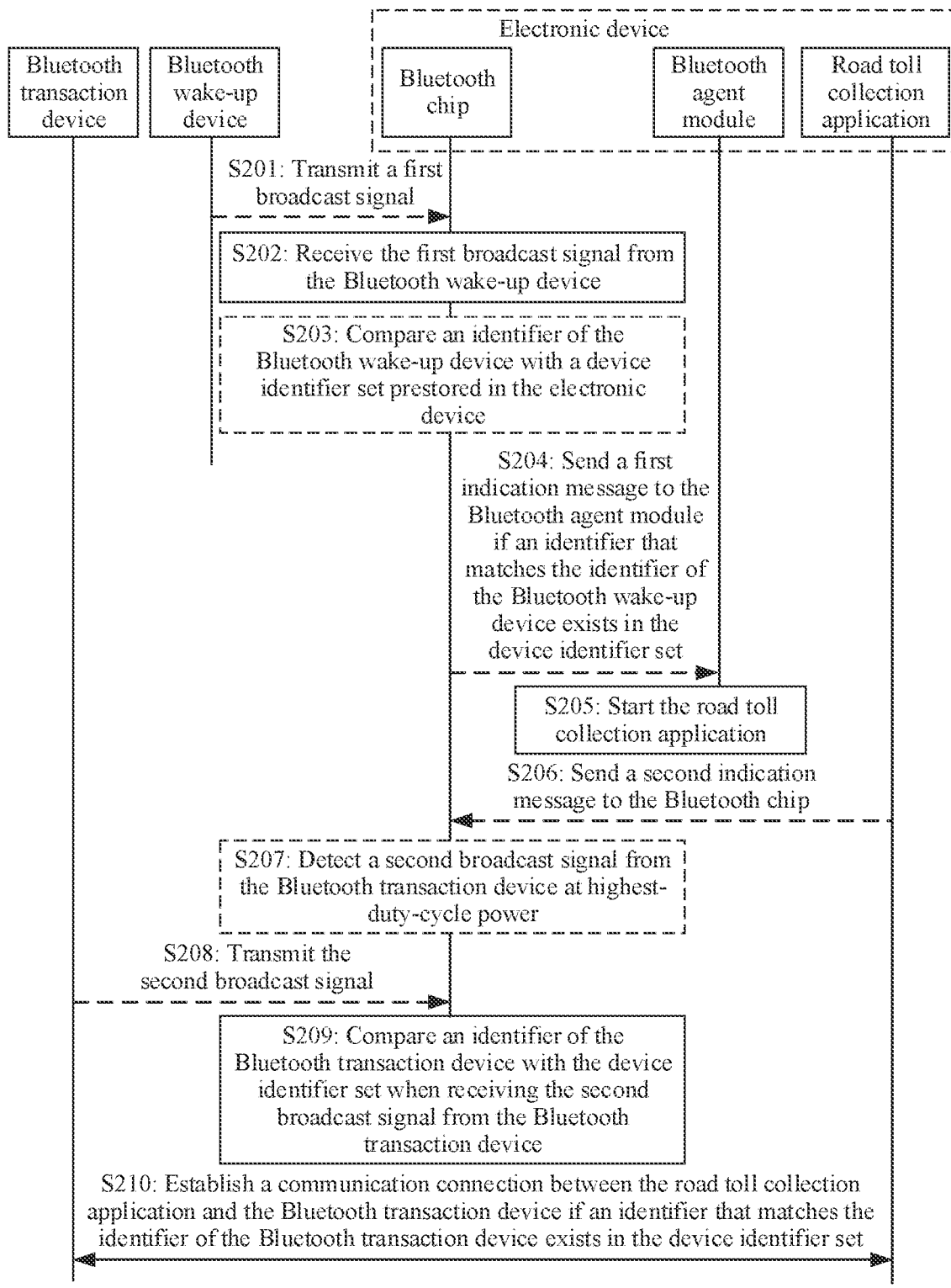
FIG. 8 is a schematic flowchart of interaction in an example target service execution method according to an embodiment of this application.

In a possible implementation, the electronic device may include a Bluetooth chip, the target application, a Bluetooth agent module, an open mobile alliance application programming interface (open mobile alliance application programming interface, OMAAPI), a secure element (secure element, SE), and a trusted execution environment (Trusted Execution Environment, TEE). The SE includes an applet (applet), and the TEE includes a TEE application (tEE application, TA). The following describes a process of the foregoing target service execution method by using an example in which the target application is a road toll collection application, the first device is a Bluetooth wake-up device, and the second device is a Bluetooth transaction device. As shown in FIG. 8, the method may include the following steps.

S201: The Bluetooth wake-up device transmits a first broadcast signal, where the first broadcast signal carries an identifier of the Bluetooth wake-up device.

S202: The Bluetooth chip receives the first broadcast signal from the Bluetooth wake-up device.

S203: The Bluetooth chip compares the identifier of the Bluetooth wake-up device with a device identifier set prestored in the electronic device.

S204: The Bluetooth chip sends a first indication message to the Bluetooth agent module if an identifier that matches the identifier of the Bluetooth wake-up device exists in the device identifier set, to indicate the Bluetooth agent module to start the road toll collection application.

S205: The Bluetooth agent module starts the road toll collection application.

S206: The road toll collection application sends a second indication message to the Bluetooth chip, to indicate the Bluetooth chip to detect a second broadcast signal from the Bluetooth transaction device.

S207: The Bluetooth chip detects the second broadcast signal from the Bluetooth transaction device at highest-duty-cycle (for example, 100%) power, where the second broadcast signal carries an identifier of the Bluetooth transaction device.

S208: The Bluetooth transaction device transmits the second broadcast signal, where the second broadcast signal carries the identifier of the Bluetooth transaction device.

S209: When receiving the second broadcast signal from the Bluetooth transaction device, the Bluetooth chip compares the identifier of the Bluetooth transaction device with the device identifier set.

S210: Establish a communication connection between the road toll collection application and the Bluetooth transaction device if an identifier that matches the identifier of the Bluetooth transaction device exists in the device identifier set, to execute a toll payment service.

The OMAAPI in the electronic device is an interface for invoking the applet in the SE by using a rich execution environment (rich execution environment, REE). The Bluetooth chip may also be connected to the SE by using the OMAAPI, and the Bluetooth chip may also be connected to the TEE. The applet in the SE and the TA in the TEE may store a ciphertext for toll payment, to provide a secure transaction environment for a payment process. In the foregoing target service execution method, it can be ensured that the road toll collection application is started before the road toll collection application establishes the communication connection to the Bluetooth transaction device, to improve a success rate of establishing the communication connection between the road toll collection application and the Bluetooth transaction device and a success rate of a payment transaction.

Figure 9:
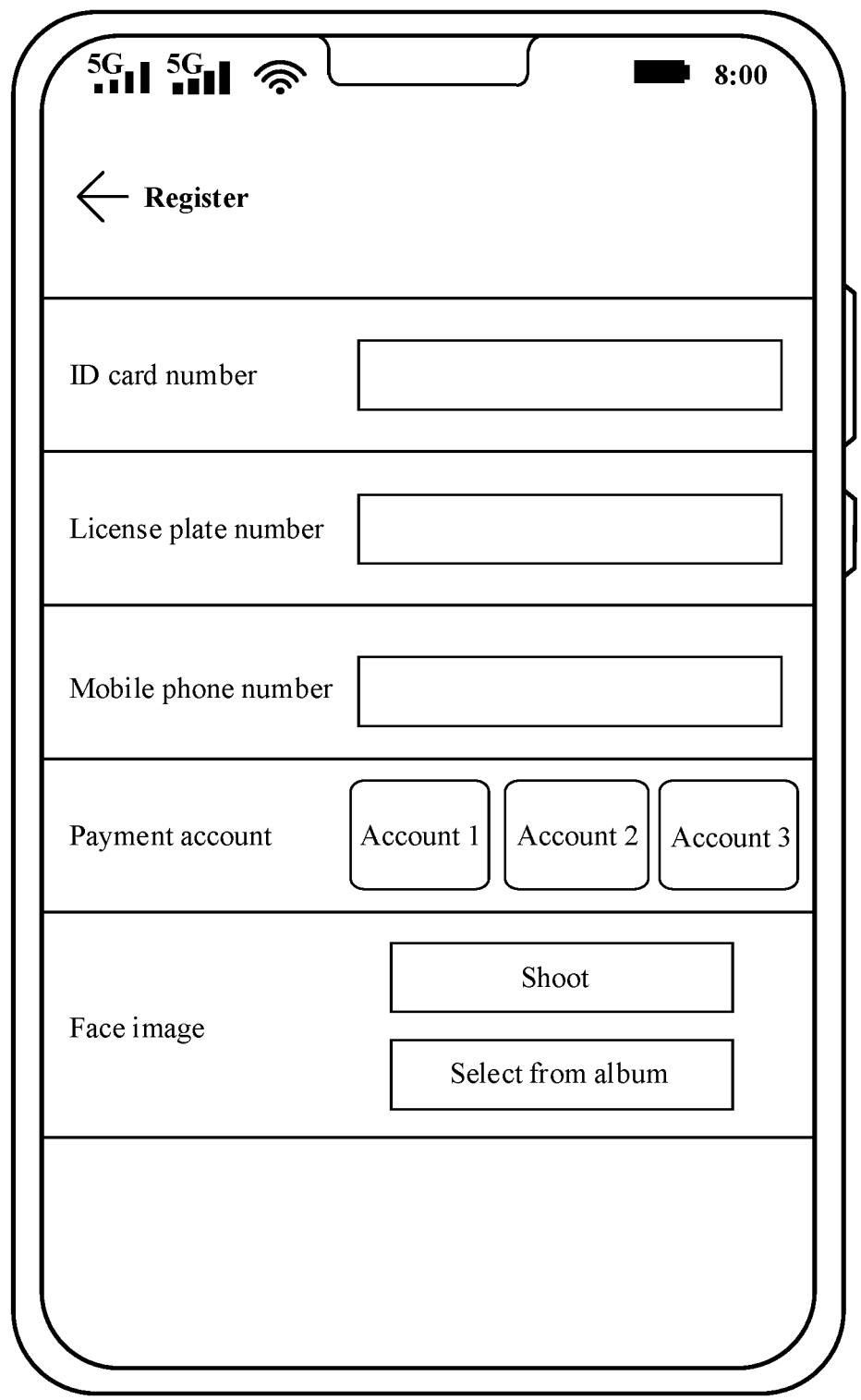
FIG. 9 is a schematic diagram of a registration interface of an example road toll collection application according to an embodiment of this application.

It may be understood that, before using the road toll collection application, the user needs to first install the application on the electronic device and perform registration. For a registration interface of the road toll collection application, refer to FIG. 9. The user needs to enter an ID card number, a license plate number, and a mobile phone number, select a payment account, and enter information such as a face image. A plurality of electronic devices may be bound to a same vehicle, and a priority of a payment account may be set. In addition, one electronic device may be bound to a plurality of vehicles, and unbinding may be performed at any time when the payment service is not required. Then, the road toll collection application sends registration information to the server. The server performs risk control check on the registration information, for example, checks security and validity of the vehicle information, the mobile phone number, and the payment account, and matching between the face image and the ID card information. After the check succeeds, the server may agree on a deduction manner with a payment background corresponding to the payment account, such as password-free deduction. Subsequently, the server may further download a transaction TA or applet to the electronic device, to provide a secure transaction environment for a payment process. Certainly, the server may alternatively download the transaction TA or applet to the electronic device after receiving the registration information sent by the road toll collection application. In other words, a moment at which the transaction TA or applet is downloaded is not limited. Then, the server further downloads an identifier of a Bluetooth device deployed on a highway ramp to the electronic device. The electronic device may store an identifier of each Bluetooth device, and grant, to the Bluetooth agent module, permission to start (or wake up) the road toll collection application. Downloading and registration of the road toll collection application may be handled by the user without using another hardware device, so that user experience is improved.

Figure 10A:
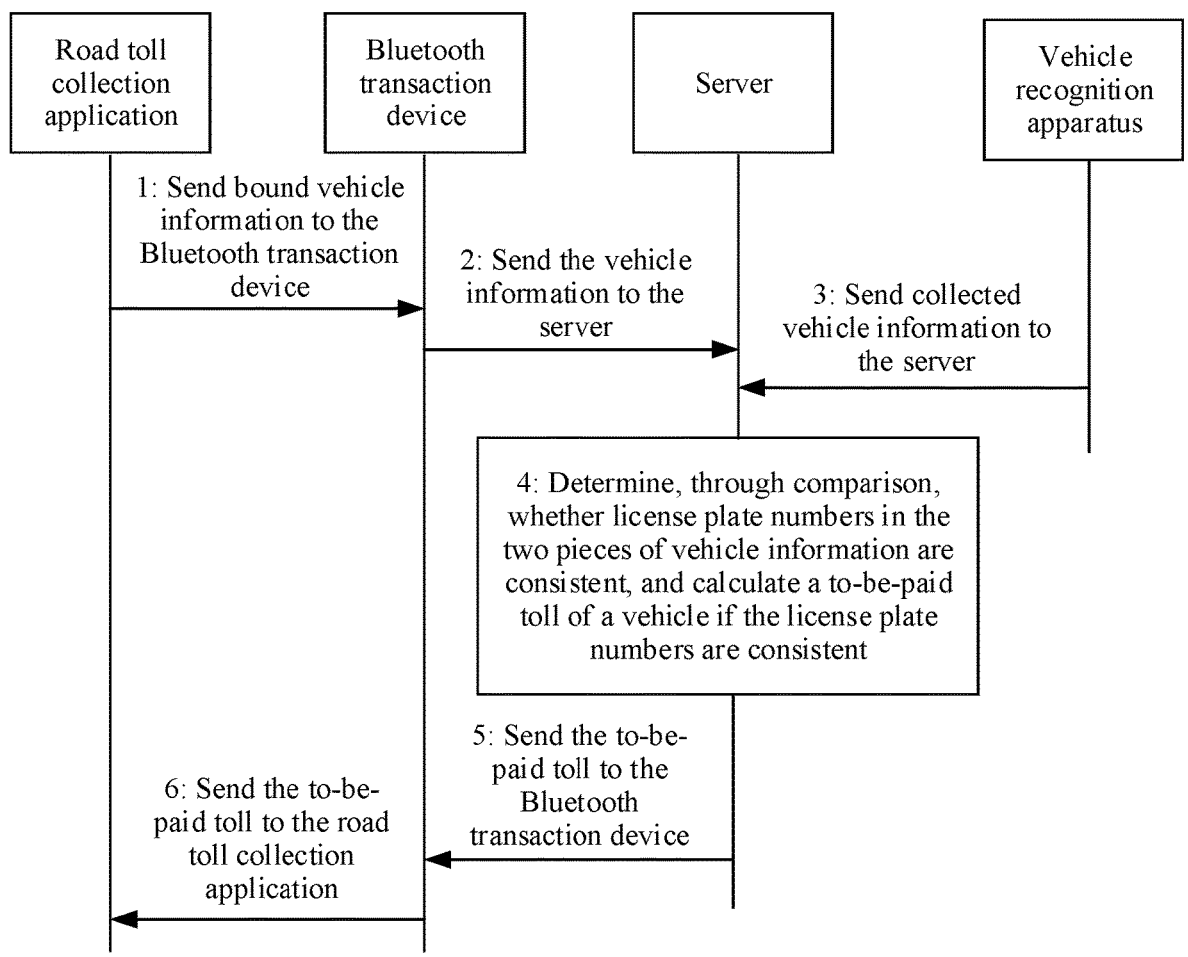
FIG. 10(a) is a schematic flowchart of an example toll payment process according to an embodiment of this application.
Figure 10B:
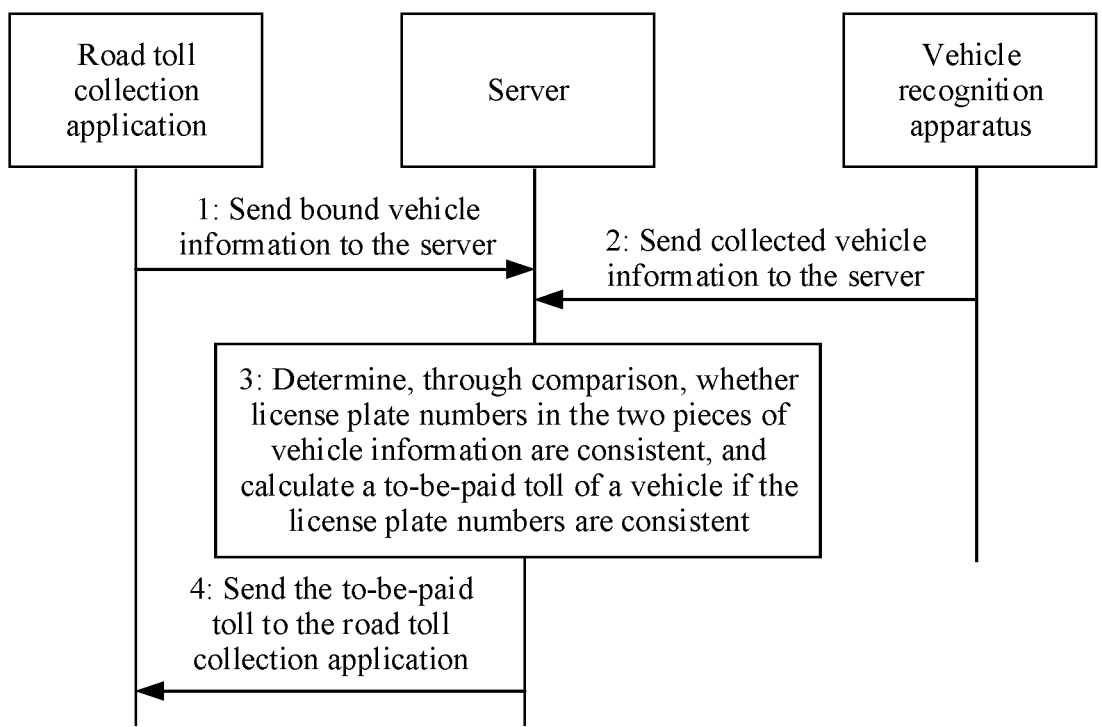
FIG. 10(b) is a schematic flowchart of another example toll payment process according to an embodiment of this application.

In the embodiment shown in FIG. 8, after the Bluetooth agent module establishes the communication connection between the road toll collection application and the Bluetooth transaction device, the road toll collection application may send vehicle information bound to the road toll collection application to the Bluetooth transaction device, and the Bluetooth transaction device sends the vehicle information to the server. In addition, the server further receives vehicle information sent by a vehicle recognition apparatus disposed at a toll station. The server determines, through comparison, whether license plate numbers in the two pieces of vehicle information are consistent, calculates a to-be-paid toll of the vehicle if the license plate numbers are consistent, and sends the to-be-paid toll to the road toll collection application through the Bluetooth transaction device for toll payment. For this process, refer to FIG. 10(a). Alternatively, the road toll collection application directly sends vehicle information bound to the road toll collection application to the server. The server compares the vehicle information with vehicle information sent by a vehicle recognition apparatus, calculates a to-be-paid toll of the vehicle if license plate numbers are consistent, and sends the to-be-paid toll to the road toll collection application for toll payment. For this process, refer to FIG. 10(b). According to this method, a toll payment process is completed, so that the user does not need to perform any operation, time costs of the user are reduced, and a safety risk caused by operating the electronic device when the user drives the vehicle is reduced.

After the toll payment service is completed, the server may notify the Bluetooth transaction device, and the Bluetooth transaction device further notifies the road toll collection application. The two parties disconnect the communication connection, and the Bluetooth chip restores a normal scanning duty cycle (for example, 5%). Then, even if a Bluetooth transaction device is still deployed in front of the vehicle, the road toll collection application no longer establishes a connection to the Bluetooth transaction device. In addition, the road toll collection application may further display a transaction result, for example, information indicating whether payment succeeds, outbound ramp or inbound ramp information, and a deduction amount, to the user in a prompt manner such as an image, a sound, or a text.

Figure 11A:
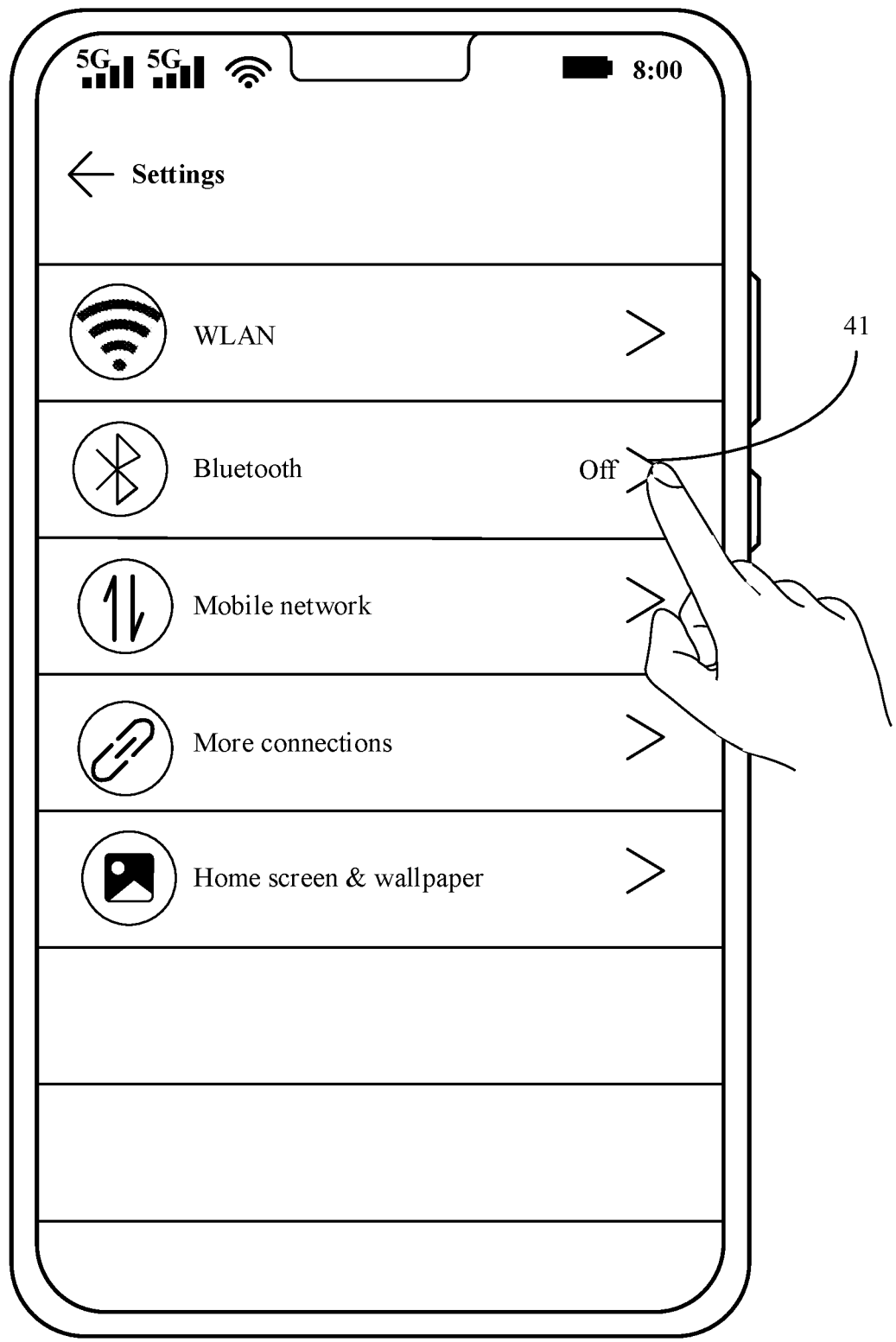
FIG. 11(a) is a schematic diagram of an example setting interface according to an embodiment of this application.
Figure 11B:
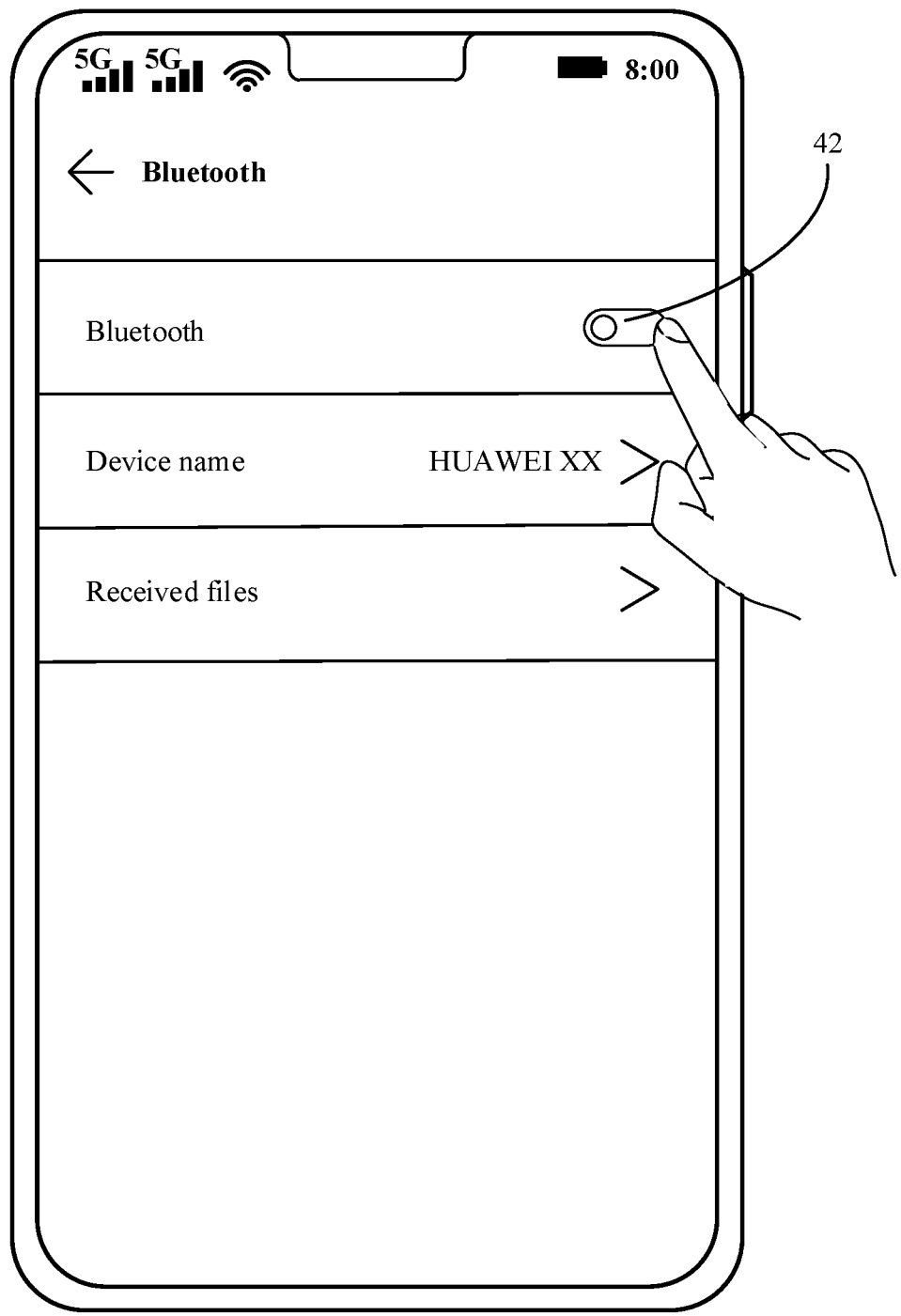
FIG. 11(b) is a schematic diagram of an example Bluetooth switch interface according to an embodiment of this application.
Figure 11C:
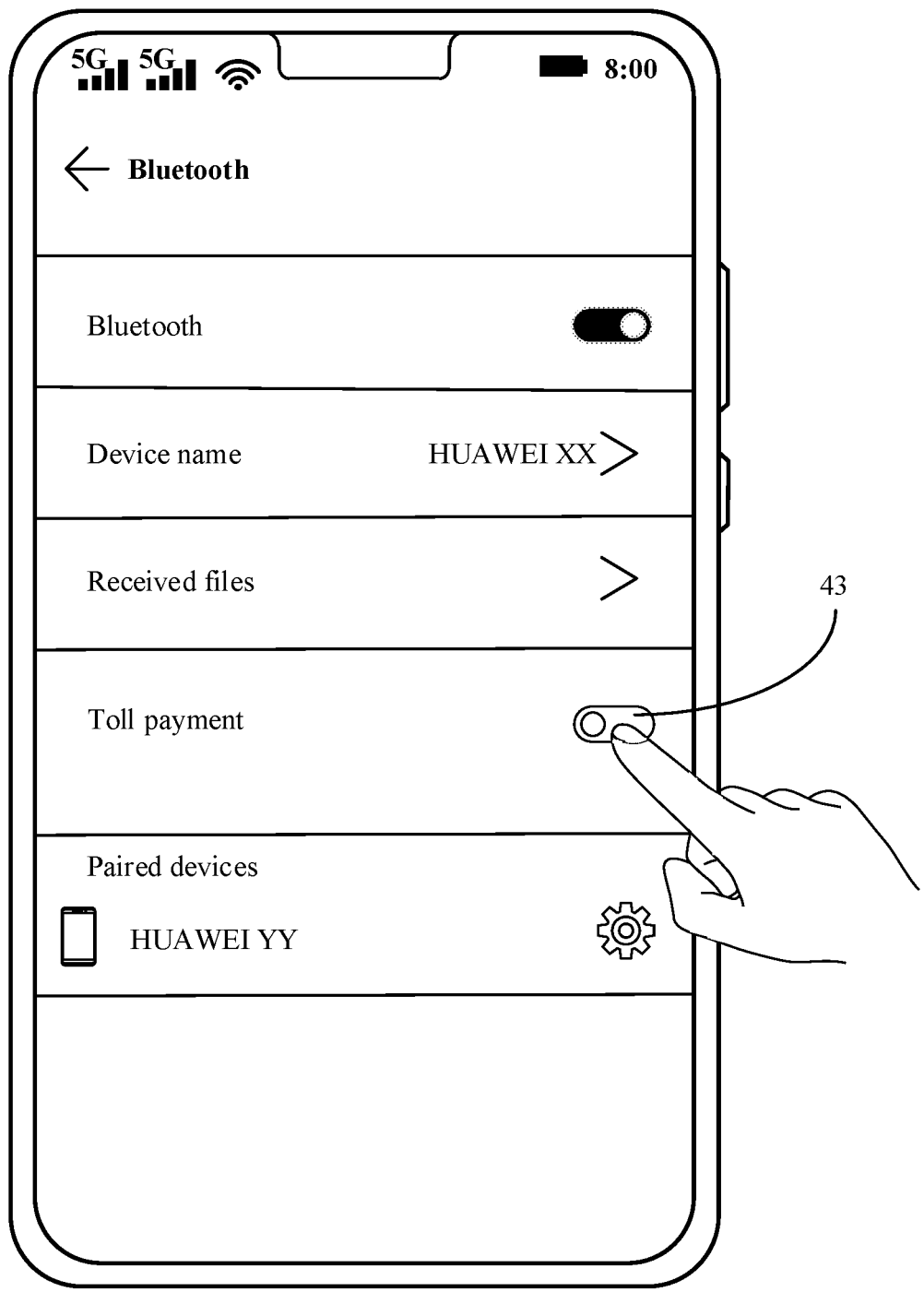
FIG. 11(c) is a schematic diagram of an example toll payment service switch interface according to an embodiment of this application.

Generally, the electronic device is in a Bluetooth-off state by default. Before driving the vehicle to the highway, the user may autonomously turn on a Bluetooth switch by using a setting interface in FIG. 11(a) to FIG. 11(c) as required. After the user taps a selection icon 41 in FIG. 11(a), the electronic device may jump to a Bluetooth switch interface shown in FIG. 11(b). After the user taps a Bluetooth switch 42 in FIG. 11(b), an interface in FIG. 11(c) may be displayed. A toll payment service may be enabled by tapping a toll payment switch 43 in the interface.

In the scenario shown in FIG. 1, if the first device 11 wakes up the target application in the electronic device, the electronic device no longer responds to broadcast signals from the first device 12, the first device 13, and the first device 14 when passing through signal coverage areas of the first device 12, the first device 13, and the first device 14. If the first device 11 does not wake up the target application in the electronic device, the first device 12 continues to wake up the target application, and so on. After the target application in the electronic device is woken up and started, the electronic device may establish a communication connection to the second device 21 when entering a signal coverage area of the second device 21. If the second device 21 fails to establish a connection to the electronic device, the electronic device may establish a communication connection to the second device 22 when entering a signal coverage area of the second device 22, and so on. When the electronic device arrives at the end of the ramp, that is, a parking gate of the ramp, if the electronic device still fails to complete the target service, biometric recognition information may be further used for authentication. For example, a face image collection apparatus may be disposed at a front end of the parking gate of the ramp. A face image can be collected when the user rolls down the window. Then, the collected face image is sent to the server for face verification, and the target service is executed after the verification succeeds. Alternatively, biometric recognition information entered by the user by using the target application may be received by the target application on the electronic device, and the biometric recognition information is sent to the server for verification, to execute the target service. Other than the face image, the biometric recognition information entered by using the target application may alternatively be a fingerprint, an iris, or the like. Certainly, such information needs to be entered by the user during registration. When the electronic device is used to collect the biometric recognition information, the user may autonomously open a collection interface, or the electronic device may automatically open a collection interface after obtaining information indicating that the target service is not successfully executed, to reduce manual operations of the user.

The scenario shown in FIG. 1 is still used as an example. It can be learned from the foregoing description that a plurality of electronic devices may be bound to a same vehicle, and one electronic device may be bound to a plurality of vehicles. It is assumed that there are two electronic devices on a vehicle A, an electronic device B is bound to the vehicle A, and an electronic device C is bound to another vehicle. In this case, on an outbound ramp, both a road toll collection application in the electronic device B and a road toll collection application in the electronic device C may be started and establish a communication connection to the second device, and then both the electronic device B and the electronic device C send bound vehicle information to the server. However, a license plate recognition apparatus at the ramp collects vehicle information of only the vehicle A. In this case, the server initiates deduction for only the electronic device B corresponding to the vehicle A. Because the server does not receive vehicle information corresponding to the electronic device C, the server does not initiate deduction for the electronic device C.

Alternatively, it is assumed that both an electronic device B and an electronic device C on a vehicle A are bound to the vehicle. On an outbound ramp, both the electronic device B and the electronic device C establish a communication connection to the second device, and the server successfully verifies vehicle information sent by the electronic device B and the electronic device C. However, because the user sets a priority of a payment account during registration, deduction is performed on a payment account with a higher deduction priority, and no repeated deduction is performed.

If the user enters the ramp without a registered electronic device, the foregoing target service execution method cannot be used to perform an unconscious transaction. However, a face image collection apparatus at the ramp may collect a face image, and send the face image to the server. After verification, if the server determines that the face image is a registered face image, the server may initiate deduction to a payment background agreed by the server, to complete payment. Alternatively, if an electronic device carried by the user has no power or is damaged and cannot start a road toll collection application, a face image collection apparatus at the ramp may collect a face image, and send the face image to the server. After verification, if the server determines that the face image is a registered face image, the server may initiate deduction to a payment background agreed by the server, to complete payment.

In addition to a scenario of a highway toll collection service, the foregoing target service execution method is also applicable to a clock-in/out scenario and another scenario (such as dangerous road section reminder, road condition broadcast, tourist attraction introduction, advertisement push of nearby merchants, and automatic reporting of trip data of a monitored person) of a fast-moving object. The following describes execution procedures in these scenarios.

Scenario 1: Clock-In/Out Scenario of a Fast-Moving Object

Figure 12:
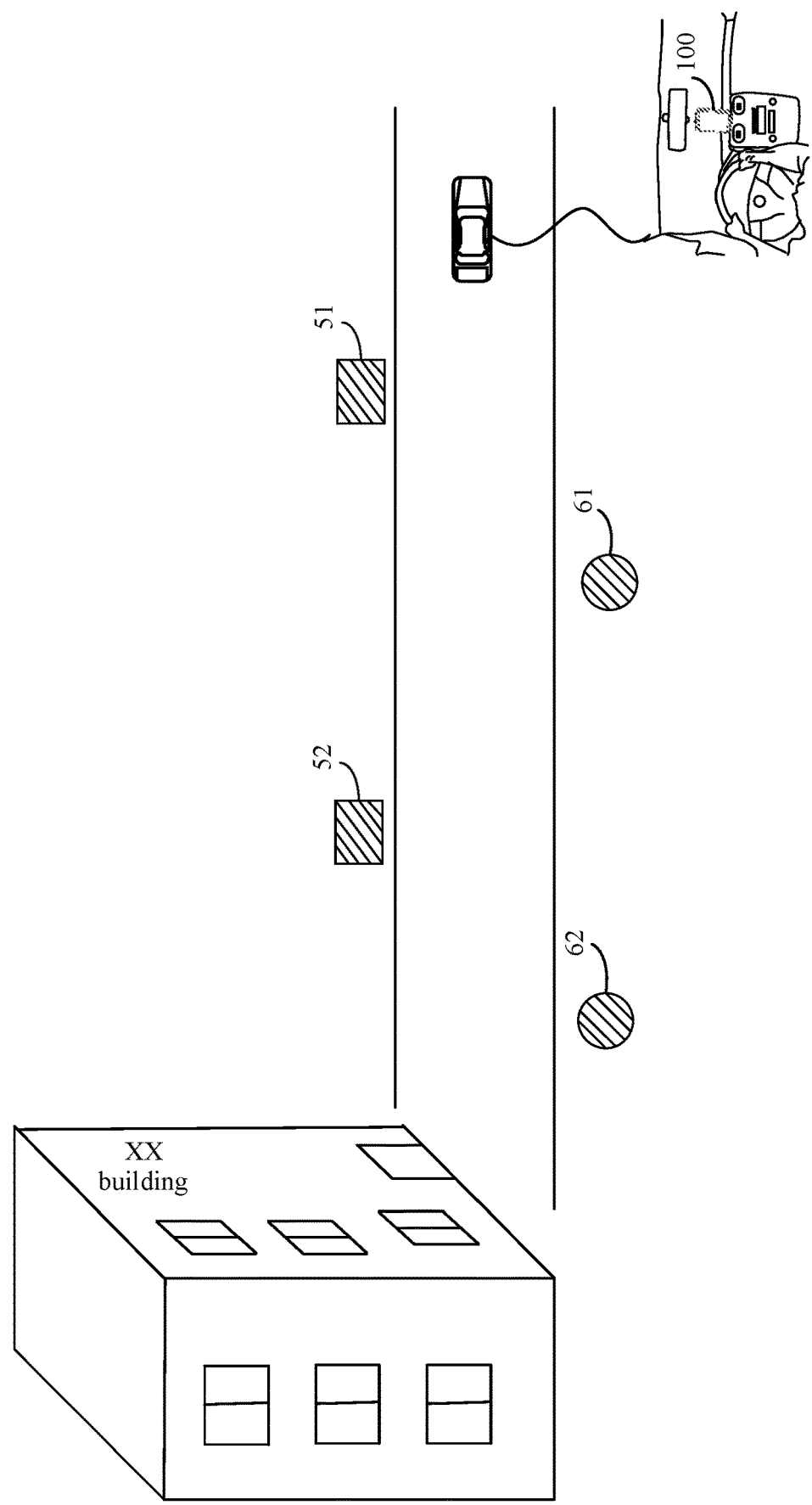
FIG. 12 is a diagram of an application scenario of another example target service execution method according to an embodiment of this application.

For a schematic diagram of the scenario 1, refer to FIG. 12. A third device 51, a third device 52, a fourth device 61, and a fourth device 62 are deployed on a roadside near a company of a user. The third device may be a Bluetooth wake-up device, and the fourth device may be a Bluetooth clock-in/out device.

When the user carries an electronic device and drives a vehicle on a road near the company, a Bluetooth chip in the electronic device receives a third broadcast signal from a Bluetooth wake-up device, where the third broadcast signal carries an identifier of the Bluetooth wake-up device. The Bluetooth chip compares the identifier of the Bluetooth wake-up device with a prestored set of identifiers of devices at a clock-in/out location. If an identifier that matches the identifier of the Bluetooth wake-up device exists in the device identifier set, the Bluetooth chip indicates a Bluetooth agent module to start a clock-in/out application. The clock-in/out application indicates the Bluetooth chip to detect a fourth broadcast signal from a Bluetooth clock-in/out device at highest-duty-cycle power, where the fourth broadcast signal carries an identifier of the Bluetooth clock-in/out device. When receiving the fourth broadcast signal from the Bluetooth clock-in/out device, the Bluetooth chip compares the identifier of the Bluetooth clock-in/out device with the device identifier set. If an identifier that matches the identifier of the Bluetooth clock-in/out device exists in the device identifier set, the Bluetooth agent module establishes a communication connection between the clock-in/out application and the Bluetooth clock-in/out device, to execute a user clock-in/out task. In the foregoing clock-in/out process, the user does not need to manually open the clock-in/out application to clock in/out. This reduces a safety risk caused by operating the electronic device during driving, and implements an automatic and safe clock-in/out process. In addition, it is difficult to forge the clock-in/out location.

Figure 13:
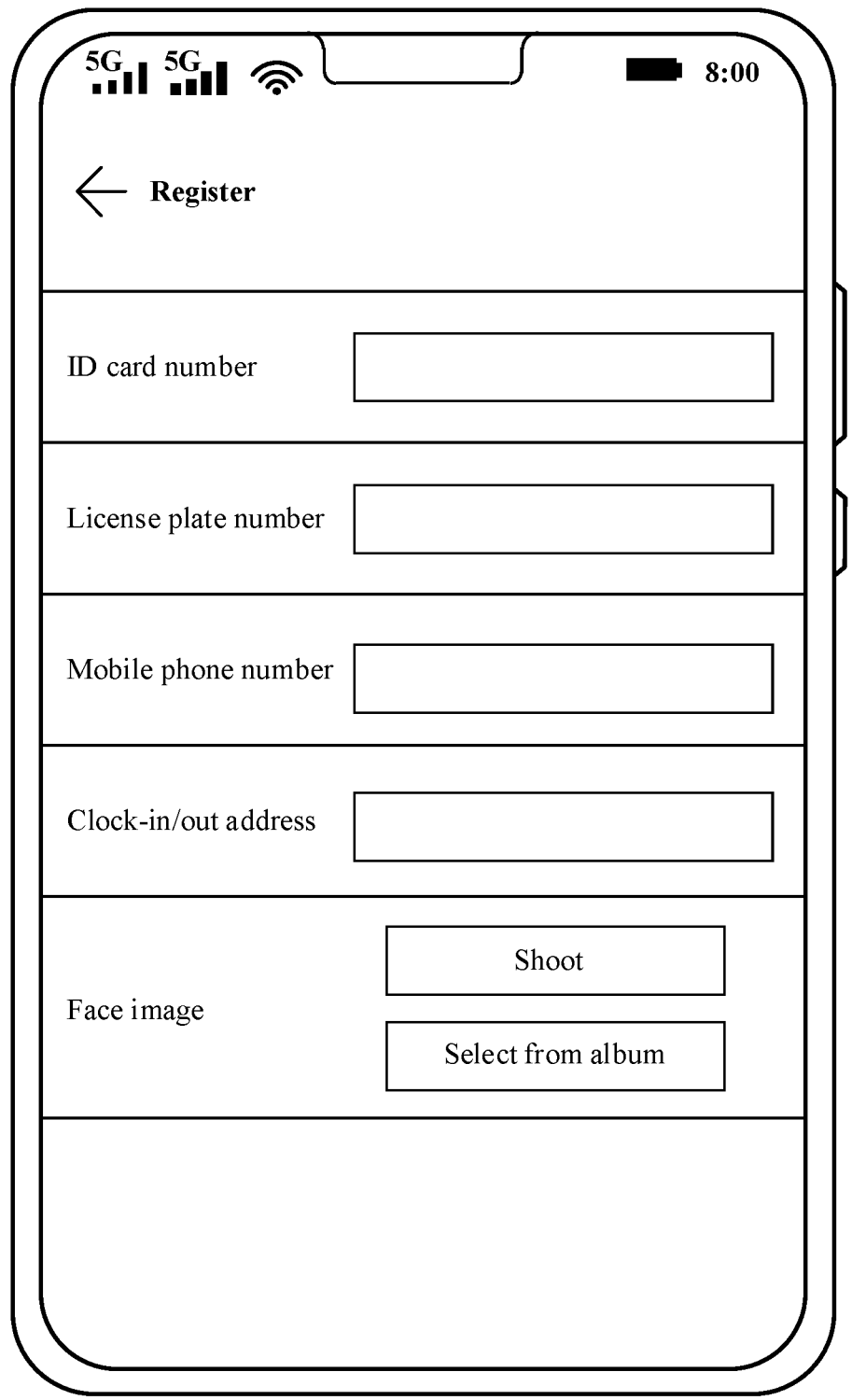
FIG. 13 is a schematic diagram of a registration interface of an example clock-in/out application according to an embodiment of this application.

Before using the electronic device to perform a clock-in/out service, the user also needs to perform registration on the clock-in/out application on the electronic device. For a registration interface, refer to FIG. 13. It should be noted that the user needs to enter a clock-in/out address during registration, so that after the electronic device sends registration information to a server, the server downloads, based on the clock-in/out location, a device identifier of a corresponding device to the electronic device for storage. In addition, after the clock-in/out application establishes the communication connection to the Bluetooth transaction device, the electronic device may send corresponding positioning information (for example, positioning information obtained through GPRS positioning) to the Bluetooth clock-in/out device, so that the Bluetooth clock-in/out device sends the positioning information to the server for verification. For example, the positioning information is matched against the clock-in/out address entered by the user during registration, and if matching succeeds, a clock-in/out success result is returned. Alternatively, the electronic device directly sends corresponding positioning information to the server for verification, to execute a clock-in/out process.

Scenario 2: Another Scenario of a Fast-Moving Object

For some dangerous road sections, a Bluetooth wake-up device and a Bluetooth broadcast device may be deployed on the road sections in both directions. When a user carrying an electronic device passes through the road section, the foregoing target service execution method may be used to establish a communication connection between the electronic device and the Bluetooth broadcast device. Then, the Bluetooth broadcast device may send, to the electronic device, a road section reminder message or a road condition broadcast message delivered by a server, to remind the user of safe driving. In addition, because Bluetooth communication is performed between the Bluetooth broadcast device and the electronic device, even if the electronic device is not connected to a network, the electronic device can still receive a safety reminder.

For a scenario such as tourist attraction introduction, advertisement push of nearby merchants, or reporting of trip data of a monitored person, an implementation method thereof is similar to the implementation method in the foregoing embodiment, and details are not described herein.

The foregoing describes in detail an example of the target service execution method provided in embodiments of this application. It may be understood that, to implement the foregoing functions, the electronic device includes corresponding hardware and/or software modules for performing the functions. A person skilled in the art should be easily aware that, with reference to the example units and algorithm steps described in the embodiments disclosed in this specification, this application can be implemented in a form of hardware or a combination of hardware and computer software. Whether a function is performed by hardware or hardware driven by computer software depends on particular applications and design constraints of the technical solutions. A person skilled in the art may use different methods for each specific application with reference to the embodiments to implement the described functions, but it should not be considered that this implementation goes beyond the scope of this application.

In embodiments of this application, the electronic device may be divided into function modules based on the foregoing method examples. For example, the electronic device may be divided into function modules corresponding to functions, for example, a detection unit, a processing unit, and a display unit, or two or more functions may be integrated into one module. The integrated module may be implemented in a form of hardware, or may be implemented in a form of a software function module. It should be noted that division into the modules in embodiments of this application is an example, and is merely logical function division. In actual implementation, there may be another division manner.

It should be noted that all related content of each step in the foregoing method embodiment may be cited to a function description of a corresponding function module, and details are not described herein again.

The electronic device provided in the embodiments is configured to perform the foregoing target service execution method, and therefore can achieve a same effect as the foregoing implementation method.

When an integrated unit is used, the electronic device may further include a processing module, a storage module, and a communication module. The processing module may be configured to control and manage an action of the electronic device. The storage module may be configured to support the electronic device in storing program code, data, and the like. The communication module may be configured to support the electronic device in communicating with another device.

The processing module may be a processor or a controller. The processing module may implement or execute logical blocks, modules, and circuits in various examples described with reference to content disclosed in this application. Alternatively, the processor may be a combination of processors implementing a computing function, for example, a combination of one or more microprocessors, or a combination of digital signal processing (digital signal processing, DSP) and a microprocessor. The storage module may be a memory. The communication module may be specifically a device that interacts with another electronic device, for example, a radio frequency circuit, a Bluetooth chip, or a Wi-Fi chip.

In an embodiment, when the processing module is a processor, and the storage module is a memory, the electronic device in the embodiments may be a device having the structure shown in FIG. 4.

An embodiment of this application further provides a computer-readable storage medium. The computer-readable storage medium stores a computer program. When the computer program is executed by a processor, the processor is enabled to perform the target service execution method according to any one of the foregoing embodiments.

An embodiment of this application further provides a computer program product. When the computer program product runs on a computer, the computer is enabled to perform the foregoing related steps, to implement the target service execution method in the foregoing embodiments.

In addition, an embodiment of this application further provides an apparatus. The apparatus may be specifically a chip, a component, or a module. The apparatus may include a processor and a memory that are connected. The memory is configured to store computer executable instructions. When the apparatus runs, the processor may execute the computer executable instructions stored in the memory, so that the chip performs the target service execution method in the foregoing method embodiments.

The electronic device, the computer-readable storage medium, the computer program product, or the chip provided in the embodiments is configured to perform the corresponding method provided above. Therefore, for beneficial effects that can be achieved, refer to beneficial effects in the corresponding method provided above. Details are not described herein again.

It may be learned by a person skilled in the art from the foregoing description of the implementations that, for convenience and brevity of description, division into only the foregoing function modules is used as an example for description. In actual application, the foregoing functions may be allocated to different function modules for implementation according to a requirement, that is, an internal structure of an apparatus is divided into different function modules, to complete all or some of the functions described above.

In the several embodiments provided in this application, it should be understood that the disclosed apparatus and method may be implemented in other manners. For example, the described apparatus embodiments are merely examples. For example, division into the modules or units is merely logical function division. In actual implementation, there may be another division manner. For example, a plurality of units or components may be combined or integrated into another apparatus, or some features may be ignored or not performed. In addition, the displayed or discussed mutual couplings or direct couplings or communication connections may be implemented through some interfaces, and indirect couplings or communication connections between apparatuses or units may be implemented in an electrical, mechanical, or another form.

The units described as separate parts may or may not be physically separate, and parts displayed as units may be one or more physical units, may be located in one place, or may be distributed in a plurality of different places. Some or all of the units may be selected according to an actual requirement to achieve the objectives of the solutions in the embodiments.

In addition, function units in embodiments of this application may be integrated into one processing unit, or each unit may exist alone physically, or two or more units may be integrated into one unit. The integrated unit may be implemented in a form of hardware, or may be implemented in a form of a software function unit.

When the integrated unit is implemented in a form of a software function unit and sold or used as an independent product, the integrated unit may be stored in a readable storage medium. Based on such an understanding, the technical solutions of embodiments of this application essentially, or the part contributing to the conventional technology, or all or some of the technical solutions may be implemented in a form of a software product. The software product is stored in a storage medium and includes several instructions for instructing a device (which may be a single-chip microcomputer, a chip, or the like) or a processor (processor) to perform all or some of the steps of the methods described in embodiments of this application. The foregoing storage medium includes any medium that can store program code, such as a USB flash drive, a removable hard disk, a read-only memory (read-only memory, ROM), a random access memory (random access memory, RAM), a magnetic disk, or an optical disc.

The foregoing content is merely specific implementations of this application. However, the protection scope of this application is not limited thereto. Any change or replacement readily figured out by a person skilled in the art within the technical scope disclosed in this application shall fall within the protection scope of this application. Therefore, the protection scope of this application shall be subject to the protection scope of the claims.

What is claimed is:

1. A target service execution method, wherein the method is performed by an electronic device and comprises:
    performing a registration process with a target application, the registration process identifying an identifier;
    receiving a first broadcast signal from a first device, wherein the first broadcast signal carries the identifier;
    starting a target application in the electronic device based on the identifier received in the first broadcast signal, wherein the starting comprises adjusting signal monitoring such that a success rate of detecting a second broadcast signal is improved; and
    receiving the second broadcast signal from a second device,
    establishing a communication connection between the target application and the second device based on an identifier of the second device that is carried in the second broadcast signal, to execute a target service corresponding to the target application,
    wherein the first device is one of at least one first device deployed on a moving path of the electronic device, the second device is one of at least one second device deployed on the moving path of the electronic device, and the first device is deployed closer to a start point of the moving path of the electronic device than the second device.

2. The method according to claim 1, wherein a deployment distance between the first device and the second device is determined based on a signal coverage area of the first device, a signal coverage area of the second device, startup duration of the target application, and a moving speed of the electronic device.

3. The method according to claim 1, wherein the starting the target application in the electronic device based on the identifier comprises:
    comparing the identifier with a device identifier set pre-stored in the electronic device; and
    starting the target application in the electronic device if an identifier in the device identifier set matches the identifier.

4. The method according to claim 3, wherein the electronic device comprises a Bluetooth agent module, and the starting the target application in the electronic device comprises:
    starting the target application in the electronic device by using the Bluetooth agent module.

5. The method according to claim 1, wherein after the starting the target application in the electronic device, the method further comprises:
    detecting the second broadcast signal from the second device at highest-duty-cycle power according to an indication instruction of the target application.

6. The method according to claim 1, wherein the target application comprises a road toll collection application, the target service comprises a toll payment service, and the executing the target service corresponding to the target application comprises:
    sending vehicle information corresponding to the electronic device to the second device, so that the second device sends the vehicle information to a server to calculate a to-be-paid toll, to execute the toll payment service; or
    sending vehicle information corresponding to the electronic device to a server, so that the server calculates a to-be-paid toll, to execute the toll payment service.

7. The method according to claim 6, wherein if the target service is not successfully executed when the electronic device arrives at an end point of the moving path, the method further comprises:
    receiving biometric recognition information entered by a user by using the target application, and sending the biometric recognition information to the server to execute the target service.

8. The method according to claim 1, wherein the target application comprises a clock-in/out application, the target service comprises a clock-in/out service, and the executing the target service corresponding to the target application comprises:
    sending positioning information corresponding to the electronic device to the second device, so that the second device sends the positioning information to a server for verification, to execute the clock-in/out service; or
    sending positioning information corresponding to the electronic device to a server for verification, to execute the clock-in/out service.

9. The method according to claim 1, wherein the method further comprises:
- receiving registration information entered by a user by using the target application, wherein the registration information comprises a user identifier and a target service identifier; and
- sending the registration information to a server for user registration.

10. An electronic device, comprising a processor, a memory, and an interface, wherein
- the processor, the memory, and the interface cooperate with each other, so that the electronic device performs the following method:
- performing a registration process with a target application, the registration process identifying an identifier;
- receiving a first broadcast signal from a first device, wherein the first broadcast signal carries the identifier;
- starting a target application in the electronic device based on the identifier received in the first broadcast signal, wherein the starting comprises adjusting signal monitoring such that a success rate of detecting a second broadcast signal is improved; and
- receiving the second broadcast signal from a second device,
- establishing a communication connection between the target application and the second device based on an identifier of the second device that is carried in the second broadcast signal, to execute a target service corresponding to the target application,
- wherein the first device is one of at least one first device deployed on a moving path of the electronic device, the second device is one of at least one second device deployed on the moving path of the electronic device, and the first device is deployed closer to a start point of the moving path of the electronic device than the second device.

11. A computer-readable storage medium, wherein the computer-readable storage medium stores a computer program, and when the computer program is executed by a processor, the processor is enabled to perform the following method:
- performing a registration process with a target application, the registration process identifying an identifier;
- receiving a first broadcast signal from a first device, wherein the first broadcast signal carries the identifier;
- starting a target application in the electronic device based on the identifier received in the first broadcast signal, wherein the starting comprises adjusting signal monitoring such that a success rate of detecting a second broadcast signal is improved; and
- receiving the second broadcast signal from a second device,
- establishing a communication connection between the target application and the second device based on an identifier of the second device that is carried in the second broadcast signal, to execute a target service corresponding to the target application,
- wherein the first device is one of at least one first device deployed on a moving path of the electronic device, the second device is one of at least one second device deployed on the moving path of the electronic device, and the first device is deployed closer to a start point of the moving path of the electronic device than the second device.

12. The computer-readable storage medium according to claim 11, further comprising comparing the identifier with identifier information stored in the electronic device, and wherein the starting the target application is based on a result of the comparing.

13. The method according to claim 11, wherein a deployment distance between the first device and the second device is determined based on a signal coverage area of the first device, a signal coverage area of the second device, startup duration of the target application, and a moving speed of the electronic device.

14. The computer-readable storage medium according to claim 11, wherein the starting the target application in the electronic device based on the identifier comprises:
- comparing the identifier with a device identifier set prestored in the electronic device; and
- starting the target application in the electronic device if an identifier in the device identifier set matches the identifier.

15. The computer-readable storage medium according to claim 14, wherein the starting the target application in the electronic device comprises:
- starting the target application in the electronic device by using a Bluetooth agent module.

16. The computer-readable storage medium according to claim 11, wherein after the starting the target application in the electronic device, the method further comprises:
- detecting the second broadcast signal from the second device at highest-duty-cycle power according to an indication instruction of the target application.

17. The computer-readable storage medium according to claim 11, wherein the target application comprises a road toll collection application, the target service comprises a toll payment service, and the executing the target service corresponding to the target application comprises:
- sending vehicle information corresponding to the electronic device to the second device, so that the second device sends the vehicle information to a server to calculate a to-be-paid toll, to execute the toll payment service; or
- sending vehicle information corresponding to the electronic device to a server, so that the server calculates a to-be-paid toll, to execute the toll payment service.

18. The computer-readable storage medium according to claim 17, wherein if the target service is not successfully executed when the electronic device arrives at an end point of the moving path, the method further comprises:
- receiving biometric recognition information entered by a user by using the target application, and sending the biometric recognition information to the server to execute the target service.

19. The computer-readable storage medium according to claim 11, wherein the target application comprises a clock-in/out application, the target service comprises a clock-in/out service, and the executing the target service corresponding to the target application comprises:
- sending positioning information corresponding to the electronic device to the second device, so that the second device sends the positioning information to a server for verification, to execute the clock-in/out service; or
- sending positioning information corresponding to the electronic device to a server for verification, to execute the clock-in/out service.

20. The computer-readable storage medium according to claim 11, wherein the method further comprises:

receiving registration information entered by a user by using the target application, wherein the registration information comprises a user identifier and a target service identifier; and sending the registration information to a server for user registration.

* * * * *